US012614492B2

(12) United States Patent
Kato

(10) Patent No.: US 12,614,492 B2
(45) Date of Patent: Apr. 28, 2026

(54) DISPLAY APPARATUS AND METHOD OF DRIVING DISPLAY PANEL USING THE SAME

(71) Applicant: Samsung Display Co., LTD., Yongin-si (KR)

(72) Inventor: Takeshi Kato, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/583,171

(22) Filed: Feb. 21, 2024

(65) Prior Publication Data

US 2024/0290239 A1 Aug. 29, 2024

(30) Foreign Application Priority Data

Feb. 23, 2023 (KR) ........................ 10-2023-0024557

(51) Int. Cl.
*G09G 3/20* (2006.01)

(52) U.S. Cl.
CPC ... *G09G 3/2003* (2013.01); *G09G 2320/0271* (2013.01)

(58) Field of Classification Search
CPC ............... G09G 3/2003; G09G 3/3607; G09G 2340/0457; G09G 2358/00; G09G 2300/0452; G09G 2320/0271; G09G 2320/0242; G09G 2320/068; G09G 2320/028
See application file for complete search history.

(56) References Cited

U.S. PATENT DOCUMENTS 9,542,875 B2 1/2017 Yang et al.
2018/0122292 A1* 5/2018 Ju ........................ G09G 3/2092
2022/0181412 A1 6/2022 Kim et al.
2023/0230521 A1 7/2023 Wu et al.

FOREIGN PATENT DOCUMENTS

KR 1020170082195 A 7/2017
WO 2022071654 A1 4/2022

OTHER PUBLICATIONS

European Search Report dated Jul. 8, 2024 issued in corresponding European Patent Application No. 24158462.2 (17 pages).

* cited by examiner

*Primary Examiner* — Yaron Cohen
(74) *Attorney, Agent, or Firm* — CANTOR COLBURN LLP

(57) ABSTRACT

A display apparatus includes a display panel including a first row first color pixel and a first row second color pixel disposed in a first row, and a second row first color pixel and a second row second color pixel disposed in a second row, and a display panel driver which determines a grayscale value from input image data. One of the first row first color pixel and the second row first color pixel is a normal pixel, and the other is a viewing angle control pixel. One of the first row second color pixel and the second row second color pixel is the normal pixel, and the other is the viewing angle control pixel. Grayscale values of the first and second row first color pixels are the same as each other. Grayscale values of the first and second row second color pixels are the same as each other.

20 Claims, 20 Drawing Sheets

FIG. 18

| | | | | | | | | |
|---|---|---|---|---|---|---|---|---|
| R11 | G11 | B11 | R12 | G12 | B12 | R13 | G13 | B13 |
| R21 | G21 | B21 | R22 | G22 | B22 | R23 | G23 | B23 |
| R31 | G31 | B31 | R32 | G32 | B32 | R33 | G33 | B33 |

DISPLAY APPARATUS AND METHOD OF DRIVING DISPLAY PANEL USING THE SAME

This application claims priority to Korean Patent Application No. 10-2023-0024557, filed on Feb. 23, 2023, and all the benefits accruing therefrom under 35 U.S.C. § 119, the content of which in its entirety is herein incorporated by reference.

BACKGROUND

1. Field

Embodiments of the invention relate to a display apparatus and a method of driving a display panel using the display apparatus. More particularly, embodiments of the invention relate to a display apparatus including a viewing angle control pixel and a method of driving a display panel using the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver and a data driver. The gate driver outputs gate signals to the gate lines. The data driver outputs data voltages to the data lines.

The display panel may include a pixel unit which is repeatedly arranged in the display panel as a repeating unit. The pixel unit may include a red pixel, a first green pixel, a blue pixel, and a second green pixel. Input image data may include red data, green data and blue data. Thus, when the display panel includes the pixel unit including the red pixel, the first green pixel, the blue pixel and the second green pixel as the repeating unit, a rendering process for determining grayscale values of the red pixel, the first green pixel, the blue pixel and the second green pixel may be desired.

In addition, the display panel may include a viewing angle control pixel (a private pixel) having a luminance perceived by a user from a side which is lower than a luminance perceived by the user from a front to operate in a private mode. In the private mode, an image of the display panel may be well shown from the front, but may not be well shown from the side.

In the private mode, only the viewing angle control pixels (the private pixels) may emit light. In a normal mode which is not the private mode, the viewing angle control pixels (the private pixels) and normal pixels may emit light.

SUMMARY

When a display apparatus is in a private mode, only viewing angle control pixels emit light so that a color change defect in which colors are perceived differently from the front and from the side may not occur. However, in a normal mode, both the viewing angle control pixel and a normal pixel emit light. In the normal mode, there is almost no difference between a perceived luminance of the viewing angle control pixel and a perceived luminance of the normal pixel from the front, but a difference between the perceived luminance of the viewing angle control pixel and the perceived luminance of the normal pixel from the side may occur.

Thus, when the display apparatus including the viewing angle control pixel displays a horizontal line pattern in the normal mode, the color change defect in which colors are perceived differently from the front and from the side may occur. Due to the color change defect, the display quality of the display panel may be deteriorated.

Embodiments of the invention provide a display apparatus capable of enhancing a display quality of a display panel by preventing a color change defect from occurring when the display apparatus including a viewing angle control pixel displays a horizontal line pattern.

Embodiments of the invention also provide a method of driving a display panel using the display apparatus.

In an embodiment of a display apparatus according to the invention, the display apparatus includes a display panel and a display panel driver. In such an embodiment, the display panel includes a first row first color pixel and a first row second color pixel, which are disposed in a first row, and a second row first color pixel and a second row second color pixel, which are disposed in a second row. In such an embodiment, the display panel driver determines a grayscale value of a pixel of the display panel from input image data. In such an embodiment, one of the first row first color pixel and the second row first color pixel is a normal pixel, and the other of the first row first color pixel and the second row first color pixel is a viewing angle control pixel. In such an embodiment, one of the first row second color pixel and the second row second color pixel is the normal pixel, and the other of the first row second color pixel and the second row second color pixel is the viewing angle control pixel. In such an embodiment, a grayscale value of the first row first color pixel is the same as a grayscale value of the second row first color pixel. In such an embodiment, a grayscale value of the first row second color pixel is the same as a grayscale value of the second row second color pixel.

In an embodiment, the display panel may further include a first row third color pixel and a second row third color pixel. In such an embodiment, one of the first row third color pixel and the second row third color pixel may be the normal pixel, and the other of the first row third color pixel and the second row third color pixel may be the viewing angle control pixel. In such an embodiment, a grayscale value of the first row third color pixel may be the same as a grayscale value of the second row third color pixel.

In an embodiment, the display panel may include a first first red pixel, a first first green pixel, a first first blue pixel and a second first green pixel sequentially disposed in the first row and a first second blue pixel, a first second green pixel, a first second red pixel and a second second green pixel, which are sequentially disposed in the second row.

In an embodiment, each of the first first red pixel and the first second blue pixel may be the normal pixel. In such an embodiment, each of the first first blue pixel and the first second red pixel may be the viewing angle control pixel.

In an embodiment, each of the first first green pixel and the second first green pixel may be the viewing angle control pixel. In such an embodiment, each of the first second green pixel and the second second green pixel may be the normal pixel.

In an embodiment, when grayscale values of the first first red pixel, the first first green pixel, the first first blue pixel, the second first green pixel, the first second blue pixel, the first second green pixel, the first second red pixel and the second second green pixel are r11, g11, b11, g12, b21, g21, r21 and g22, respectively, and grayscale values of the input image data corresponding to the first first red pixel, the first first green pixel, the first first blue pixel, the second first green pixel, the first second blue pixel, the first second green pixel, the first second red pixel and the second second green pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; and g11=g12=g21=g22=(G11+G12+G21+G22)/4 may be satisfied.

In an embodiment, when grayscale values of the first first red pixel, the first first green pixel, the first first blue pixel, the second first green pixel, the first second blue pixel, the first second green pixel, the first second red pixel and the second second green pixel are r11, g11, b11, g12, b21, g21, r21 and g22, respectively, and grayscale values of the input image data corresponding to the first first red pixel, the first first green pixel, the first first blue pixel, the second first green pixel, the first second blue pixel, the first second green pixel, the first second red pixel and the second second green pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; g11=g21=(G11+G21)/2; and g12=g22=(G12+G22)/2 may be satisfied.

In an embodiment, when grayscale values of the first first red pixel, the first first green pixel, the first first blue pixel, the second first green pixel, the first second blue pixel, the first second green pixel, the first second red pixel and the second second green pixel are r11, g11, b11, g12, b21, g21, r21 and g22, respectively, and grayscale values of the input image data corresponding to the first first red pixel, the first first green pixel, the first first blue pixel, the second first green pixel, the first second blue pixel, the first second green pixel, the first second red pixel and the second second green pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; g11=g22=(G11+G22)/2; and g12=g21=(G12+G21)/2 may be satisfied.

In an embodiment, the display panel may include a first first green pixel, a first first blue pixel, a second first green pixel and a first first red pixel, which are sequentially disposed in the first row, and a first second green pixel, a first second red pixel, a second second green pixel and a first second blue pixel, which are sequentially disposed in the second row. In such an embodiment, each of the first first red pixel and the first second blue pixel may be the normal pixel, and each of the first first blue pixel and the first second red pixel may be the viewing angle control pixel. In such an embodiment, each of the first first green pixel and the second first green pixel may be the viewing angle control pixel, and each of the first second green pixel and the second second green pixel may be the normal pixel.

In an embodiment, when grayscale values of the first first green pixel, the first first blue pixel, the second first green pixel, the first first red pixel, the first second green pixel, the first second red pixel, the second second green pixel and the first second blue pixel are g11, b11, g12, r11, g21, r21, g22 and b21, respectively, and grayscale values of the input image data corresponding to the first first green pixel, the first first blue pixel, the second first green pixel, the first first red pixel, the first second green pixel, the first second red pixel, the second second green pixel and the first second blue pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; and g11=g12=g21=g22=(G11+G12+G21+G22)/4 may be satisfied.

In an embodiment, when grayscale values of the first first green pixel, the first first blue pixel, the second first green pixel, the first first red pixel, the first second green pixel, the first second red pixel, the second second green pixel and the first second blue pixel are g11, b11, g12, r11, g21, r21, g22 and b21, respectively, and grayscale values of the input image data corresponding to the first first green pixel, the first first blue pixel, the second first green pixel, the first first red pixel, the first second green pixel, the first second red pixel, the second second green pixel and the first second blue pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; g11=g21=(G11+G21)/2; and g12=g22=(G12+G22)/2 may be satisfied.

In an embodiment, the display panel may include a first first blue pixel, a first first green pixel, a first first red pixel and a second first green pixel, which are sequentially disposed in the first row, and a first second red pixel, a first second green pixel, a first second blue pixel and a second second green pixel, which are sequentially disposed in the second row. In such an embodiment, each of the first first blue pixel and the first second red pixel may be the normal pixel, and each of the first first red pixel and the first second blue pixel may be the viewing angle control pixel. In such an embodiment, each of the first first green pixel and the second first green pixel may be the normal pixel, and each of the first second green pixel and the second second green pixel may be the viewing angle control pixel.

In an embodiment, when grayscale values of the first first blue pixel, the first first green pixel, the first first red pixel, the second first green pixel, the first second red pixel, the first second green pixel, the first second blue pixel and the second second green pixel are b11, g11, r11, g12, r21, g21, b21 and g22, respectively, and grayscale values of the input image data corresponding to the first first blue pixel, the first first green pixel, the first first red pixel, the second first green pixel, the first second red pixel, the first second green pixel, the first second blue pixel and the second second green pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; and g11=g12=g21=g22=(G11+G12+G21+G22)/4 may be satisfied.

In an embodiment, when grayscale values of the first first blue pixel, the first first green pixel, the first first red pixel, the second first green pixel, the first second red pixel, the first second green pixel, the first second blue pixel and the second second green pixel are b11, g11, r11, g12, r21, g21, b21 and g22, respectively, and grayscale values of the input image data corresponding to the first first blue pixel, the first first green pixel, the first first red pixel, the second first green pixel, the first second red pixel, the first second green pixel, the first second blue pixel and the second second green pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4, g11=g21=(G11+G21)/2; and g12=g22=(G12+G22)/2 may be satisfied.

In an embodiment, the display panel may include a first first green pixel, a first first red pixel, a second first green pixel and a first first blue pixel, which are sequentially disposed in the first row, and a first second green pixel, a first second blue pixel, a second second green pixel and a first second red pixel, which are sequentially disposed in the second row. In such an embodiment, each of the first first red pixel and the first second blue pixel may be the viewing angle control pixel, and each of the first first blue pixel and the first second red pixel may be the normal pixel. In such an embodiment, each of the first first green pixel and the second first green pixel may be the normal pixel, and each of the first second green pixel and the second second green pixel may be the viewing angle control pixel.

In an embodiment, when grayscale values of the first first green pixel, the first first red pixel, the second first green pixel, the first first blue pixel, the first second green pixel, the first second blue pixel, the second second green pixel and the first second red pixel are g11, r11, g12, b11, g21, b21, g22 and r21, respectively, and grayscale values of the input image data corresponding to the first first green pixel, the first first red pixel, the second first green pixel, the first first blue pixel, the first second green pixel, the first second blue pixel, the second second green pixel and the first second red pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; and $g11=g12=g21=g22=(G11+G12+G21+G22)/4$ may be satisfied.

In an embodiment, when grayscale values of the first first green pixel, the first first red pixel, the second first green pixel, the first first blue pixel, the first second green pixel, the first second blue pixel, the second second green pixel and the first second red pixel are g11, r11, g12, b11, g21, b21, g22 and r21, respectively, and grayscale values of the input image data corresponding to the first first green pixel, the first first red pixel, the second first green pixel, the first first blue pixel, the first second green pixel, the first second blue pixel, the second second green pixel and the first second red pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g21=(G11+G21)/2$; and $g12=g22=(G12+G22)/2$ may be satisfied.

In an embodiment, the display panel may include a red pixel and a green pixel disposed in a first first block, a blue pixel and a green pixel disposed in a second first block, a red pixel and a green pixel disposed in a third first block, a blue pixel and a green pixel disposed in a first second block, a red pixel and a green pixel disposed in a second second block, a blue pixel and a green pixel disposed in a third second block, a red pixel and a green pixel disposed in a first third block, a blue pixel and a green pixel disposed in a second third block and a red pixel and a green pixel disposed in a third third block. In such an embodiment, when grayscale values of the input image data corresponding to the first first block, the second first block, the third first block, the first second block, the second second block, the third second block, the first third block, the second third block and the 3-3 block are R11, G11, B11, R12, G12, B12, R13, G13, B13, R21, G21, B21, R22, G22, B22, R23, G23, B23, R31, G31, B31, R32, G32, B32, R33, G33 and B33, respectively, a grayscale value of the red pixel in the second second block is r22, and a grayscale value of the green pixel in the second second block is g22, the following equations: $r22=R11*F1+R12*F2+R13*F3+R21*F4+R22*F5+R23*F6+R31*F7+R32*F8+R33*F9$; $g22=G11*F1+G12*F2+G13*F3+G21*F4+G22*F5+G23*F6+G31*F7+G32*F8+G33*F9$; and $F1+F2+F3+F4+F5+F6+F7+F8+F9=1$ may be satisfied.

In an embodiment of a method of driving a display panel according to the invention, the method includes operating a rendering process determining a grayscale value of a pixel of the display panel from input image data and displaying an image based on the grayscale value of the pixel. In such an embodiment, the display panel includes a first row first color pixel and a first row second color pixel, which are disposed in a first row, and a second row first color pixel and a second row second color pixel, which are disposed in a second row. In such an embodiment, one of the first row first color pixel and the second row first color pixel is a normal pixel, and the other of the first row first color pixel and the second row first color pixel is a viewing angle control pixel. In such an embodiment, one of the first row second color pixel and the second row second color pixel is the normal pixel, and the other of the first row second color pixel and the second row second color pixel is the viewing angle control pixel. In such an embodiment, a grayscale value of the first row first color pixel is the same as a grayscale value of the second row first color pixel. In such an embodiment, a grayscale value of the first row second color pixel is the same as a grayscale value of the second row second color pixel.

In an embodiment, the display panel may further include a first row third color pixel and a second row third color pixel. In such an embodiment, one of the first row third color pixel and the second row third color pixel may be the normal pixel and the other of the first row third color pixel and the second row third color pixel may be the viewing angle control pixel. In such an embodiment, a grayscale value of the first row third color pixel may be the same as a grayscale value of the second row third color pixel.

According to the display apparatus and the method of driving the display panel, the rendering process may be operated in a way such that the red pixel in the first row and the red pixel in the second row have a same grayscale value as each other, and the blue pixel in the first row and the blue pixel in the second row have a same grayscale value as each other. Thus, when the display apparatus including the normal pixel and the viewing angle control pixel displays the horizontal line pattern in the normal mode, the color change defect in which colors are perceived differently from the front and from the side may be effectively prevented so that the display quality of the display panel may be enhanced.

BRIEF DESCRIPTION OF THE DRAWINGS

The above and other features of the invention will become more apparent by describing in detailed embodiments thereof with reference to the accompanying drawings, in which:

FIGS. 18 and 19 are conceptual diagrams illustrating a rendering process of the driving controller of FIG. 1 according to an embodiment of the invention;

DETAILED DESCRIPTION

Figure 1:
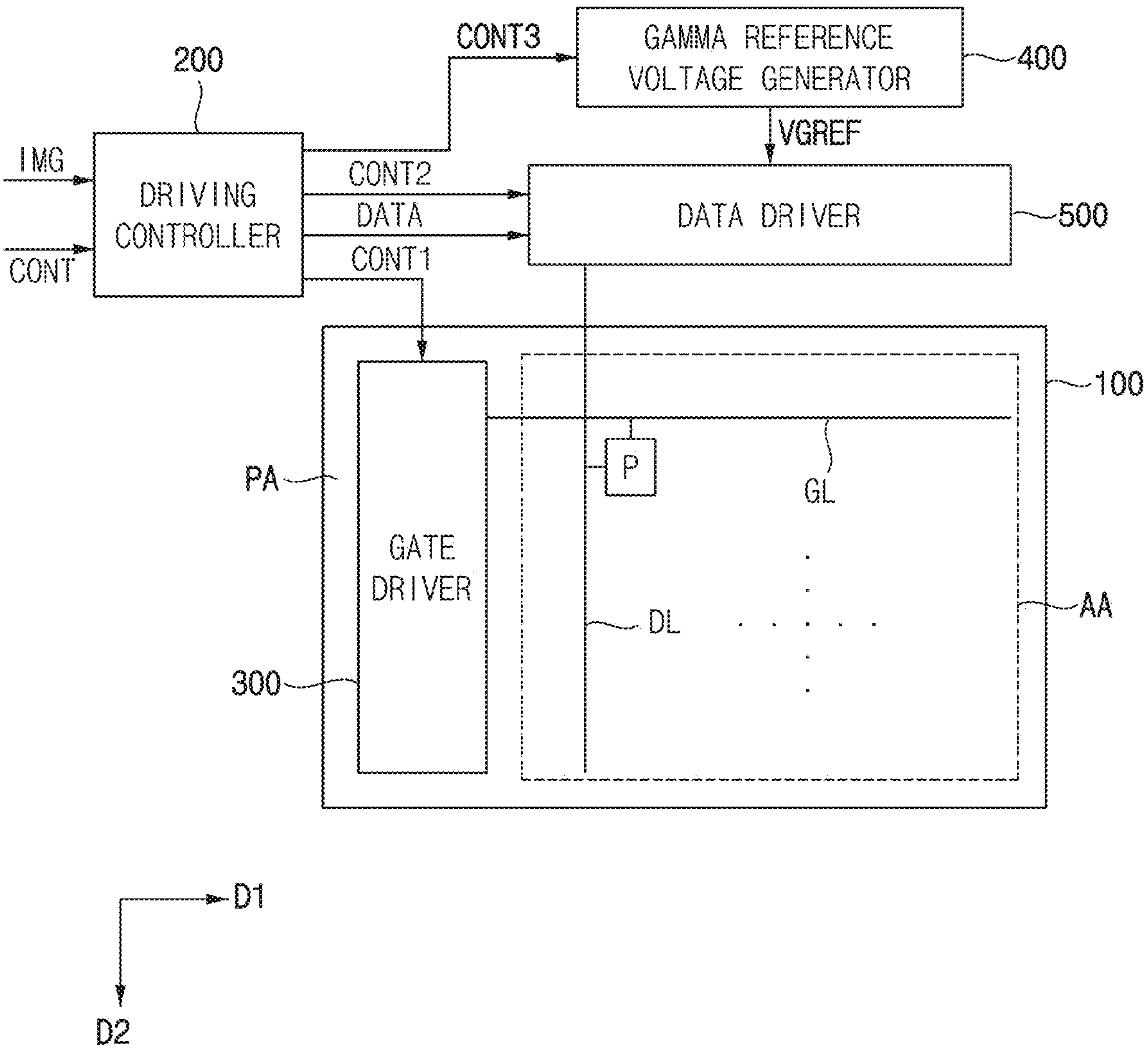
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate driver 300, a gamma reference voltage generator 400 and a data driver 500. The display panel driver may operate a rendering process for determining grayscale values of pixels of the display panel based on input image data IMG.

In an embodiment, for example, the driving controller 200 and the data driver 500 may be integrally formed as a single chip. In an embodiment, for example, the driving controller 200, the gamma reference voltage generator 400 and the data driver 500 may be integrally formed as a single chip. A driving module including at least the driving controller 200 and the data driver 500 which are integrally formed therein may be referred to as a timing controller embedded data driver (TED).

The display panel 100 includes a display region AA, on which an image is displayed, and a peripheral region PA adjacent to the display region AA.

The display panel 100 includes a plurality of gate lines GL, a plurality of data lines DL and a plurality of pixels connected to the gate lines GL and the data lines DL. The gate lines GL may extend in a first direction D1, and the data lines DL may extend in a second direction D2 crossing the first direction D1.

The driving controller 200 receives input image data IMG and an input control signal CONT from an external apparatus. In an embodiment, the input image data IMG may include red image data, green image data and blue image data. The input image data IMG may further include white image data. Alternatively, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a gate control signal CONT1, a data control signal CONT2, a gamma control signal CONT3 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

The gate driver 300 generates gate signals for driving the gate lines GL in response to the gate control signal CONT1 received from the driving controller 200. The gate driver 300 outputs the gate signals to the gate lines GL. In an embodiment, for example, the gate driver 300 may sequentially output the gate signals to the gate lines GL. In an embodiment, for example, the gate driver 300 may be mounted on the peripheral region PA of the display panel 100. In an embodiment, for example, the gate driver 300 may be integrated on the peripheral region PA of the display panel 100.

The gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
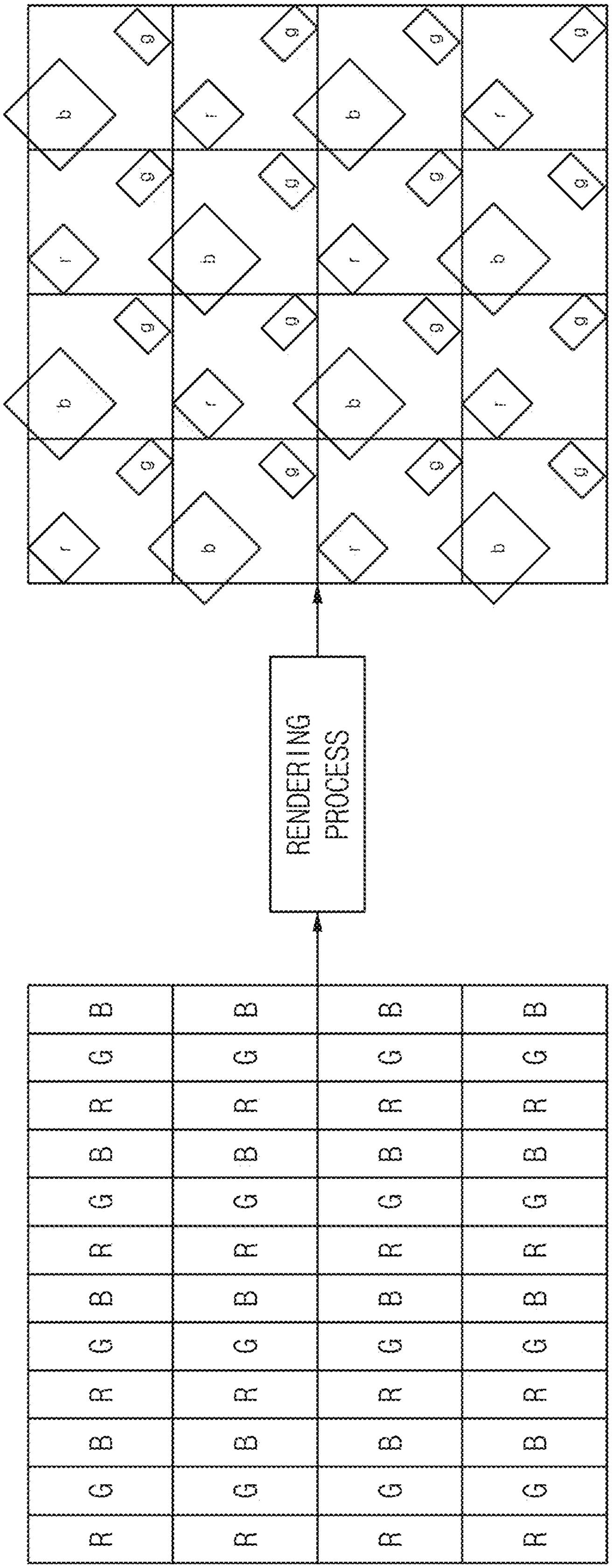
FIG. 2 is a conceptual diagram illustrating a rendering process of a driving controller of FIG. 1.

FIG. 2 is a conceptual diagram illustrating a rendering process of the driving controller 200 of FIG. 1.

Referring to FIGS. 1 and 2, in an embodiment, the driving controller 200 may operate the rendering process for determining the grayscale values of the pixels of the display panel 100 based on the input image data IMG. In an alternative embodiment, the data driver 500 may operate the rendering process.

In an embodiment, for example, the display panel 100 may include a pixel unit including a red pixel, a first green pixel, a blue pixel and a second green pixel as a repeating unit. In an embodiment, for example, the display panel 100 may include a pixel unit including a red pixel, a first green pixel, a blue pixel and a second green pixel in a first pixel row and a blue pixel, a first green pixel, a red pixel and a second green pixel in a second pixel row as a repeating unit.

The input image data IMG may include red data R, green data G and blue data B. In an embodiment where the display panel 100 includes the pixel unit including the red pixel, the first green pixel, the blue pixel and the second green pixel as the repeating unit, the rendering process may be desired to determine the grayscale values of the red pixel, the first green pixel, the blue pixel and the second green pixel.

Figure 3:
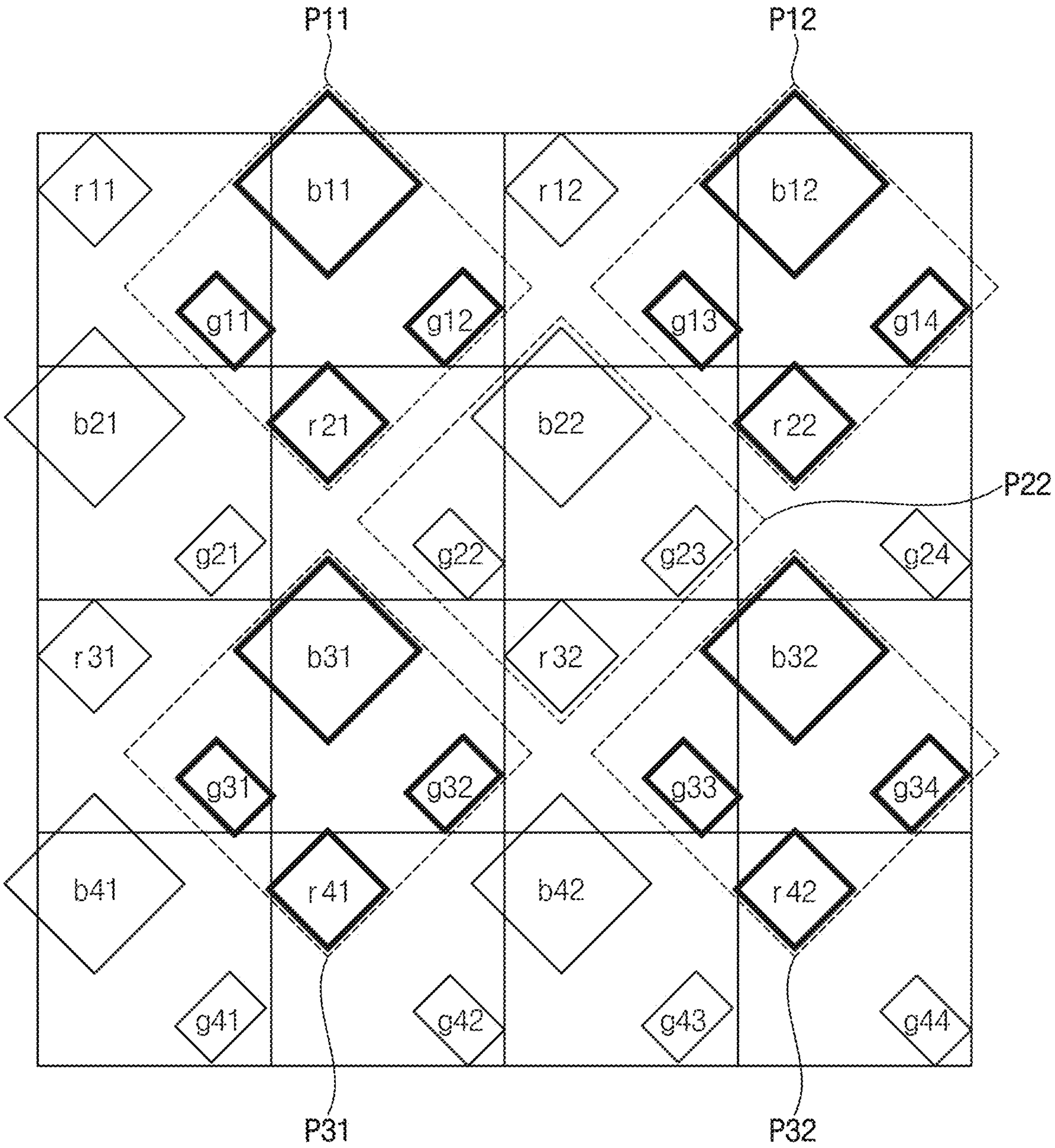
FIG. 3 is a conceptual diagram illustrating a pixel structure of a display panel of FIG. 1.

FIG. 3 is a conceptual diagram illustrating a pixel structure of the display panel 100 of FIG. 1.

Referring to FIGS. 1 to 3, the display panel 100 may include a first first red pixel (hereinafter, will be referred to as "1-1 red pixel") r11, a first first green pixel (hereinafter, will be referred to as "1-1 green pixel") g11, a first first blue pixel (hereinafter, will be referred to as "1-1 blue pixel") b11, a second first green pixel (hereinafter, will be referred to as "1-2 green pixel") g12, a second first red pixel (hereinafter, will be referred to as "1-2 red pixel") r12, a third first green pixel (hereinafter, will be referred to as "1-3 green pixel") g13, a second first blue pixel (hereinafter, will be referred to as "1-2 blue pixel") b12 and a fourth first green pixel (hereinafter, will be referred to as "1-4 green pixel") g14 which are sequentially disposed in a first row.

In the first row, a position in a vertical direction at which a light emitting area of the red pixel and a light emitting area of the blue pixel are disposed may be different from a position in the vertical direction at which the light emitting area of the green pixel is disposed in the first row. In an embodiment, for example, the position in the vertical direction at which the light emitting area of the red pixel and the light emitting area of the blue pixel are disposed may be higher (i.e., disposed more upwardly) than the position in the vertical direction at which the light emitting area of the green pixel is disposed in the first row. However, in the specification, a row including the 1-1 red pixel r11, the 1-1 green pixel g11, the 1-1 blue pixel b11 and the 1-2 green pixel g12, which are disposed in a zig-zag manner, may be defined as the first row.

The display panel 100 may include a first second blue pixel (hereinafter, will be referred to as "2-1 blue pixel") b21, a first second green pixel (hereinafter, will be referred to as "2-1 green pixel") g21, a first second red pixel (hereinafter, will be referred to as "2-1 red pixel") r21, a second second green pixel (hereinafter, will be referred to as "2-2 green pixel") g22, a second second blue pixel (hereinafter, will be referred to as "2-2 blue pixel") b22, a third second green pixel (hereinafter, will be referred to as "2-3 green pixel") g23, a second second red pixel (hereinafter, will be referred to as "2-2 red pixel") r22 and a fourth second green pixel (hereinafter, will be referred to as "2-4 green pixel") g24 which are sequentially disposed in a second row.

The display panel 100 may include a first third red pixel (hereinafter, will be referred to as "3-1 red pixel") r31, a first third green pixel (hereinafter, will be referred to as "3-1 green pixel") g31, a first third blue pixel (hereinafter, will be referred to as "3-1 blue pixel") b31, a second third green pixel (hereinafter, will be referred to as "3-2 green pixel") g32, a second third red pixel (hereinafter, will be referred to as "3-2 red pixel") r32, a third third green pixel (hereinafter, will be referred to as "3-3 green pixel") g33, a second third blue pixel (hereinafter, will be referred to as "3-2 blue pixel") b32 and a fourth third green pixel (hereinafter, will be referred to as "3-4 green pixel") g34 which are sequentially disposed in a third row.

The display panel 100 may include a first fourth blue pixel (hereinafter, will be referred to as "4-1 blue pixel") b41, a first fourth green pixel (hereinafter, will be referred to as "4-1 green pixel") g41, a first fourth red pixel (hereinafter, will be referred to as "4-1 red pixel") r41, a second fourth green pixel (hereinafter, will be referred to as "4-2 green pixel") g42, a second fourth blue pixel (hereinafter, will be referred to as "4-2 blue pixel") b42, a third fourth green pixel (hereinafter, will be referred to as "4-3 green pixel") g43, a second fourth red pixel (hereinafter, will be referred to as "4-2 red pixel") r42 and a fourth fourth green pixel (hereinafter, will be referred to as "4-4 green pixel") g44 which are sequentially disposed in a fourth row.

In an embodiment of the display panel 100, one light emitting area of the red pixel, one light emitting area of the blue pixel, and two light emitting areas of the green pixels may be disposed in a diamond shape.

In an embodiment, for example, the light emitting area of the blue pixel may be greater than the light emitting area of the red pixel. In an embodiment, for example, the light emitting area of the red pixel may be greater than the light emitting area of the green pixel. In an embodiment, for example, the light emitting area of the blue pixel may have a diamond shape. In an embodiment, for example, the light emitting area of the red pixel may have a diamond shape.

The display panel 100 may include a normal pixel and a viewing angle control pixel (a private pixel). The viewing angle control pixel may be the private pixel for a private mode. A side luminance of the viewing angle control pixel perceived by a user from a side may be less than a front luminance of the viewing angle control pixel perceived by a user from a front. In an embodiment, for example, the viewing angle control pixel may include a light blocking pattern disposed on a light emitting area. Due to the light blocking pattern, the side luminance of the viewing angle control pixel may be perceived lower than the front luminance of the viewing angle control pixel.

In the private mode, only the viewing angle control pixels emit light so that the image of the display panel 100 may be well perceived from the front, but not well perceived from the side, so the user's privacy may be protected. In the normal mode which is not the private mode, the viewing angle control pixel and the normal pixel may emit light.

A front luminance of the normal pixel perceived by a user from a front may be substantially the same as a front luminance of the viewing angle control pixel perceived by a user from a front. A side luminance of the normal pixel perceived by a user from a side may be greater than a side luminance of the viewing angle control pixel perceived by a user from a side.

The front luminance of the normal pixel may be substantially the same as the side luminance of the normal pixel. However, the front luminance of the viewing angle control pixel may be greater than the side luminance of the viewing angle control pixel. In an embodiment, for example, the side luminance of the viewing angle control pixel may be equal to or less than a half of the front luminance of the viewing angle control pixel.

In FIG. 3, a pixel drawn to have a relatively thin border may be the normal pixel and a pixel drawn to have a relatively thick border may be the viewing angle control pixel.

One light emitting area r32 of a red pixel, one light emitting area b22 of a blue pixel and two light emitting areas g22 and g23 of green pixels forming a normal pixel group (e.g. P22) may be disposed in a diamond shape.

One light emitting area of a red pixel, one light emitting area of a blue pixel and two light emitting areas of green pixels forming a viewing angle control pixel group (e.g. P11, P12, P31 and P32) may be disposed in a diamond shape.

In an embodiment, for example, a blue viewing angle control pixel may be disposed adjacent to a red viewing angle control pixel in a vertical direction in the display panel 100. In an embodiment, for example, a blue normal pixel may be disposed adjacent to a red normal pixel in the vertical direction in the display panel 100.

In an embodiment, for example, green viewing angle control pixels may be disposed adjacent to each other in a horizontal direction in the display panel 100. In an embodiment, for example, green normal pixels may be disposed adjacent to each other in the horizontal direction in the display panel 100.

Figure 4:
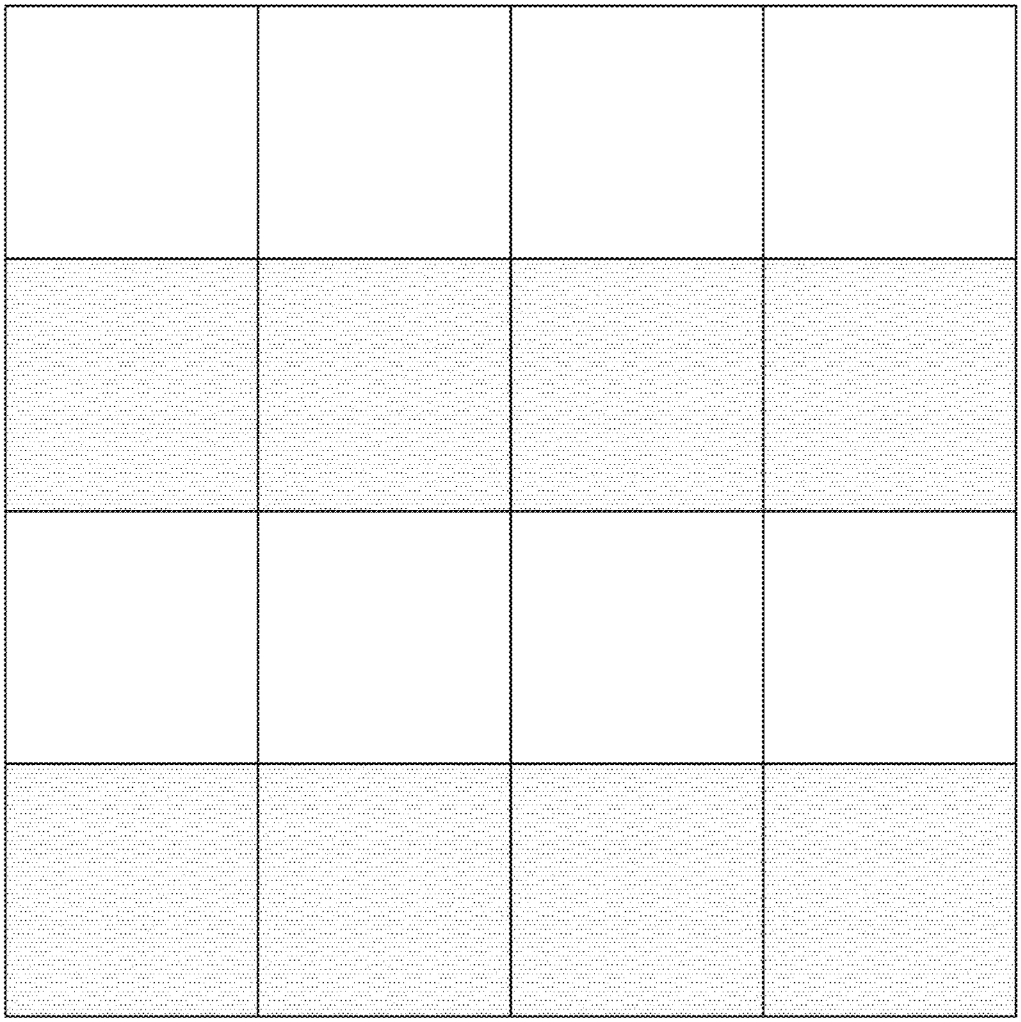
FIG. 4 is a conceptual diagram illustrating a first horizontal line pattern displayed by a display panel of FIG. 1.
Figure 5:
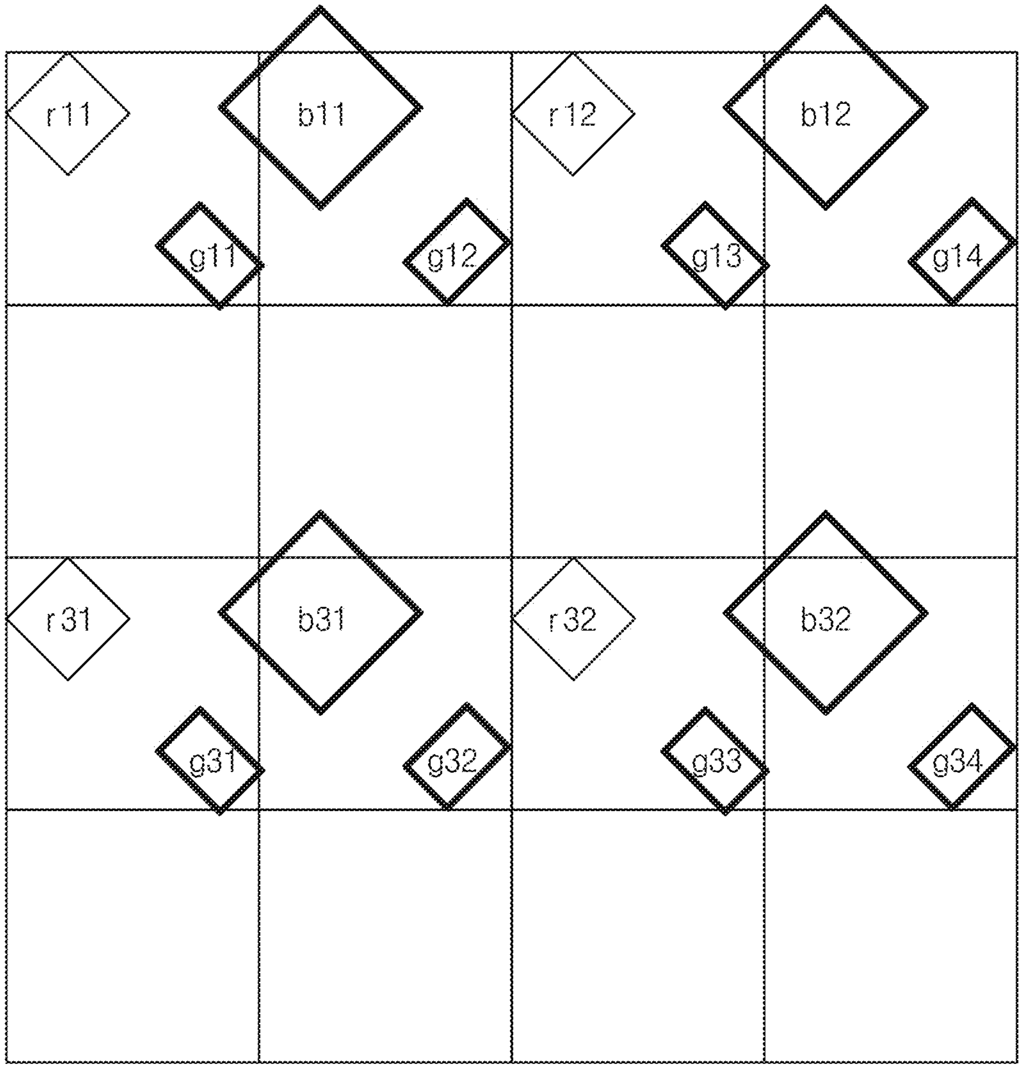
FIG. 5 is a conceptual diagram illustrating the first horizontal line pattern displayed by the display panel of FIG. 1 and the display panel is shown to a user from a front.
Figure 6:
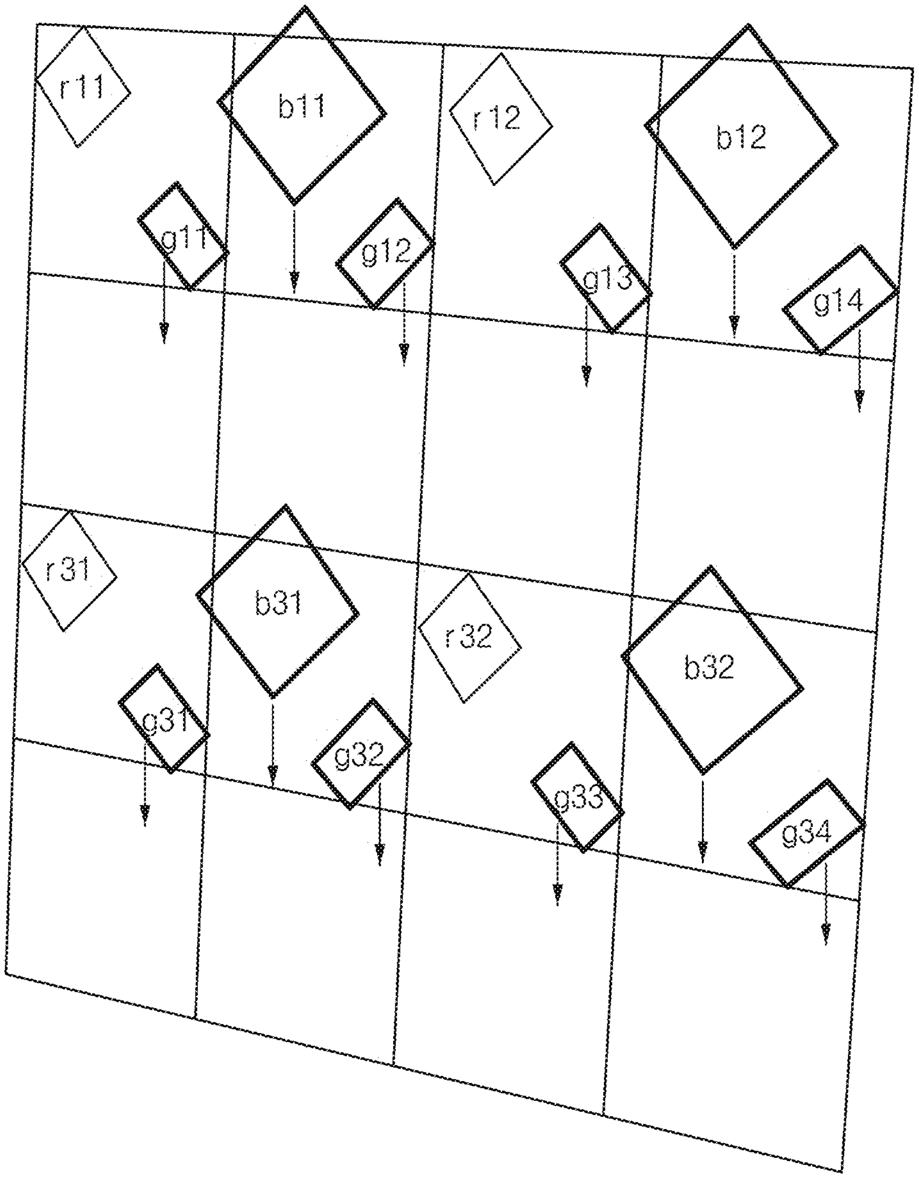
FIG. 6 is a conceptual diagram illustrating the first horizontal line pattern displayed by the display panel of FIG. 1 and the display panel is shown to a user from a side.

FIG. 4 is a conceptual diagram illustrating a first horizontal line pattern displayed by the display panel 100 of FIG. 1. FIG. 5 is a conceptual diagram illustrating the first horizontal line pattern displayed by the display panel 100 of FIG. 1 and the display panel 100 is shown to a user from a front. FIG. 6 is a conceptual diagram illustrating the first horizontal line pattern displayed by the display panel 100 of FIG. 1 and the display panel 100 is shown to a user from a side.

FIGS. 4 to 6 represent a case in which a color change defect in which colors are perceived differently from the front and from the side occurs when a horizontal line pattern is displayed in a conventional rendering method.

In the conventional rendering method, grayscale values of pixels in a first row are generated using input image data for the first row, grayscale values of pixels in a second row are generated using input image data for the second row, grayscale values of pixels in a third row are generated using input image data for the third row, and grayscale values of pixels in a fourth row are generated using input image data for the fourth row.

A first row and a third row display a white image and a second row and a fourth row display a black image in the first horizontal line pattern of FIG. 4.

FIG. 5 shows a case of viewing the display panel 100 from the front, and the normal pixels r11 and r12 in the first row and the viewing angle control pixels b11, g11, g12, b12, g13 and g14 in the first row are brightly perceived at a desired luminance level so that the display panel 100 may display a white image of the first row well. Like the first row, the display panel 100 may display a white image of the third row well.

FIG. 6 shows a case of viewing the display panel 100 from the side, and the normal pixels r11 and r12 in the first row may be brightly perceived like the front luminance level but the viewing angle control pixels b11, g11, g12, b12, g13 and g14 in the first row may be perceived at a luminance level lower than the front luminance level. Like the first row, the normal pixels in the third row may be brightly perceived like the front luminance level but the viewing angle control pixels in the third row may be perceived at a luminance level lower than the front luminance level. In this case, the white stripe pattern is desired to be viewed even in the case of FIG. 6, but the luminance of the blue and green pixels is lower than the luminance of the red pixels so that the white stripe pattern may appear reddish.

Thus, in the conventional rendering method, a color change defect in which the first horizontal line pattern looks white from the front but looks red from the side may occur.

Figure 7:
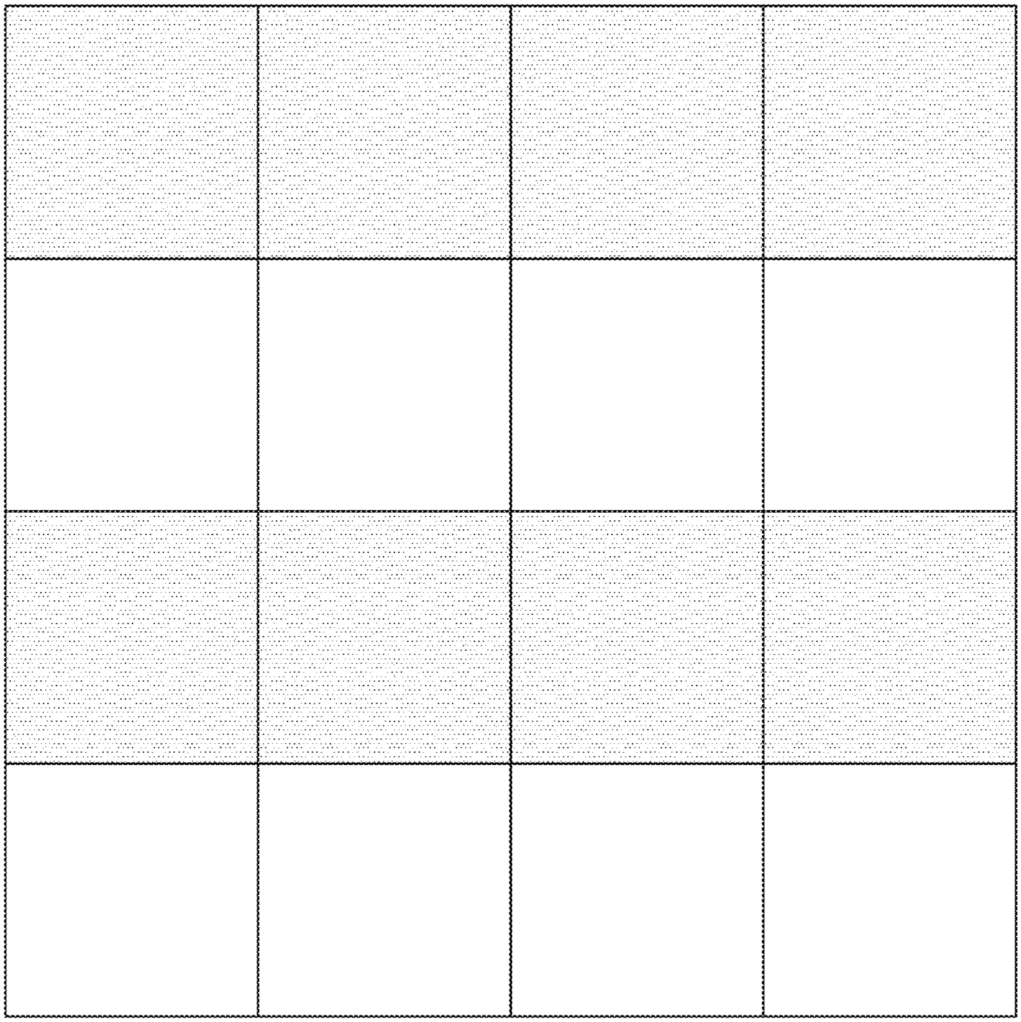
FIG. 7 is a conceptual diagram illustrating a second horizontal line pattern displayed by the display panel of FIG. 1.
Figure 8:
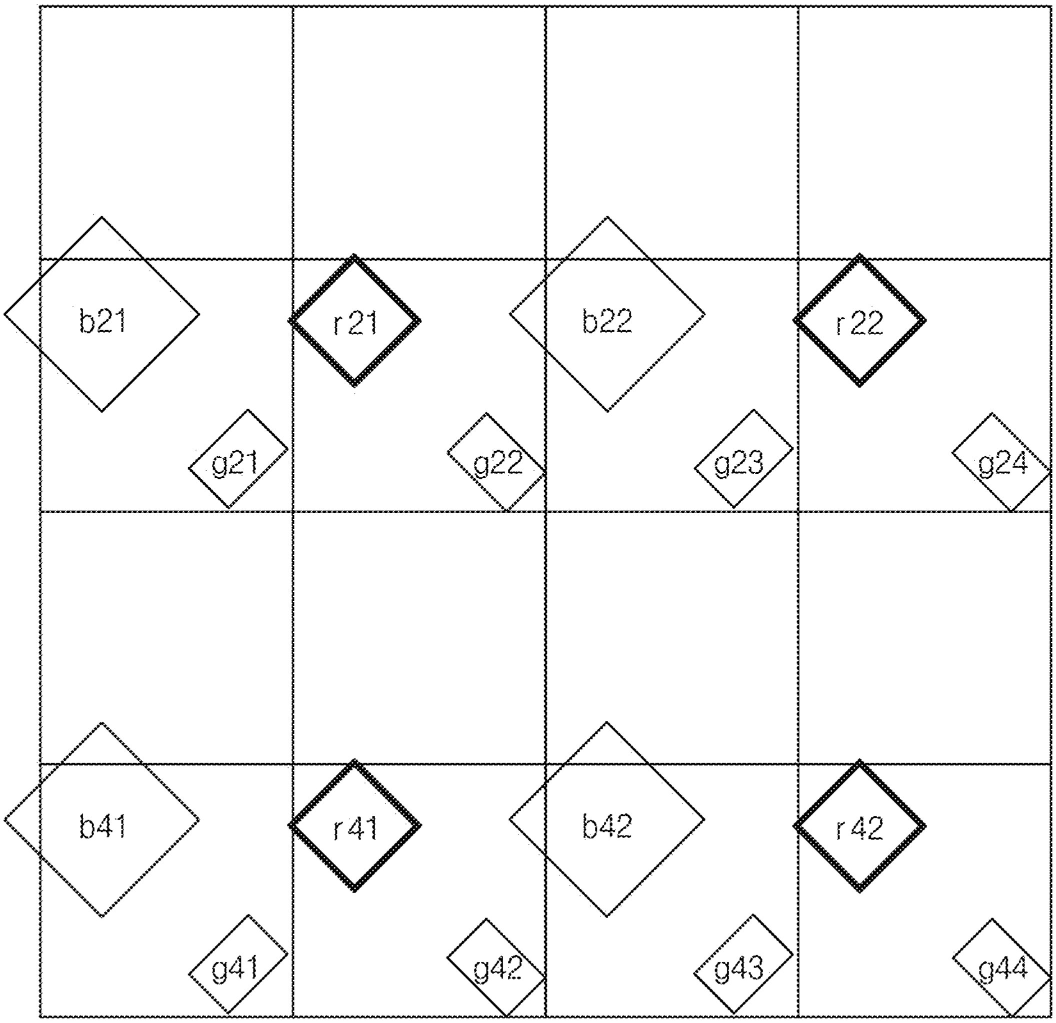
FIG. 8 is a conceptual diagram illustrating the second horizontal line pattern displayed by the display panel of FIG. 1 and the display panel is shown to a user from a front.
Figure 9:
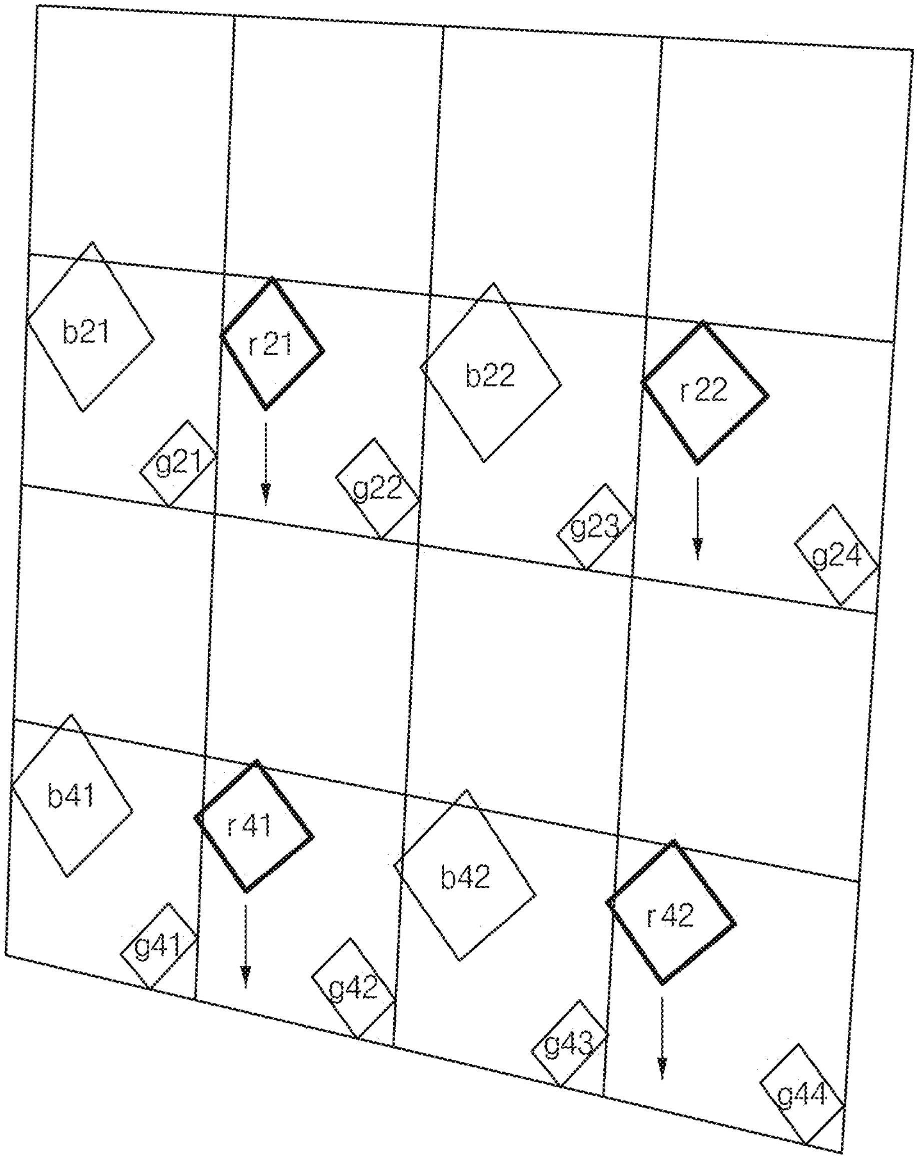
FIG. 9 is a conceptual diagram illustrating the second horizontal line pattern displayed by the display panel of FIG. 1 and the display panel is shown to a user from a side.

FIG. 7 is a conceptual diagram illustrating a second horizontal line pattern displayed by the display panel 100 of FIG. 1. FIG. 8 is a conceptual diagram illustrating the second horizontal line pattern displayed by the display panel 100 of FIG. 1 and the display panel 100 is shown to a user from a front. FIG. 9 is a conceptual diagram illustrating the second horizontal line pattern displayed by the display panel 100 of FIG. 1 and the display panel 100 is shown to a user from a side.

FIGS. 7 to 9 represent a case in which a color change defect in which colors are perceived differently from the front and from the side occurs when a horizontal line pattern is displayed in a conventional rendering method.

In the conventional rendering method, grayscale values of pixels in a first row are generated using input image data for the first row, grayscale values of pixels in a second row are generated using input image data for the second row, grayscale values of pixels in a third row are generated using input image data for the third row, and grayscale values of pixels in a fourth row are generated using input image data for the fourth row.

A second row and a fourth row display a white image and a first row and a third row display a black image in the second horizontal line pattern of FIG. 7.

FIG. 8 shows a case of viewing the display panel 100 from the front, and the normal pixels b21, g21, g22, b22, g23 and g24 in the second row and the viewing angle control pixels r21 and r22 in the second row are brightly perceived at a desired luminance level so that the display panel 100 may display a white image of the second row well. Like the second row, the display panel 100 may display a white image of the fourth row well.

FIG. 9 shows a case of viewing the display panel 100 from the side, and the normal pixels b21, g21, g22, b22, g23 and g24 in the second row may be brightly perceived like the front luminance level but the viewing angle control pixels r21 and r22 in the second row may be perceived at a luminance level lower than the front luminance level. Like the second row, the normal pixels in the fourth row may be brightly perceived like the front luminance level but the viewing angle control pixels in the fourth row may be perceived at a luminance level lower than the front luminance level. In this case, the white stripe pattern is desired to be viewed even in the case of FIG. 9, but the luminance of the red pixels is lower than the luminance of the blue and green pixels so that the white stripe pattern may appear blueish or cyanish.

Thus, in the conventional rendering method, a color change defect in which the second horizontal line pattern looks white from the front but looks blue or cyan from the side may occur.

Figure 10:
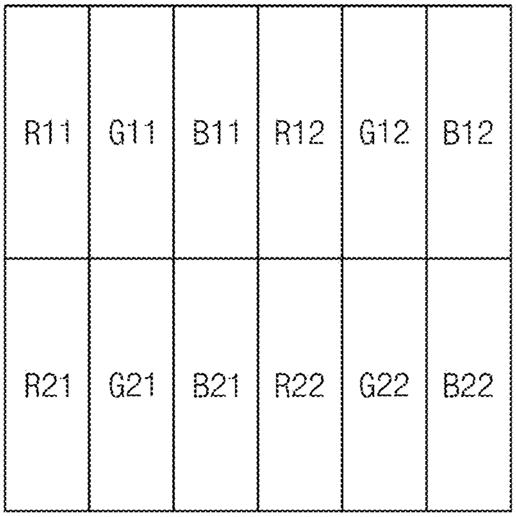
FIGS. 10 and 11 are conceptual diagrams illustrating a rendering process of the driving controller of FIG. 1 according to an embodiment of the invention.
Figure 11:
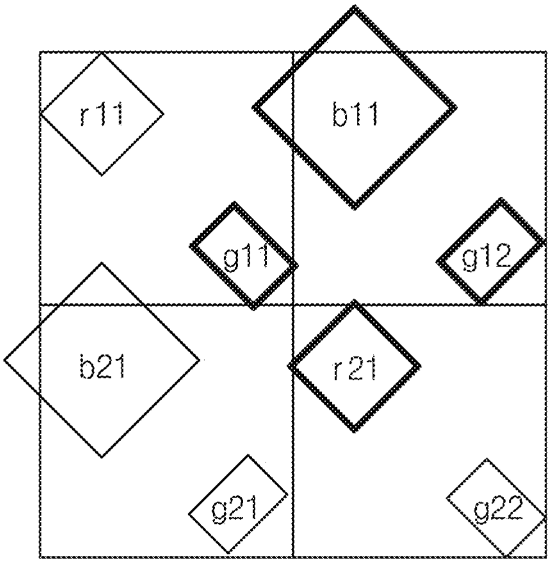

FIGS. 10 and 11 are conceptual diagrams illustrating a rendering process of the driving controller 200 of FIG. 1 according to an embodiment of the invention.

FIG. 10 represents an input unit of an input of the rendering process. In an embodiment, for example, the input unit may include four red grayscale values R11, R12, R21 and R22, four green grayscale values G11, G12, G21 and G22 and four blue grayscale values B11, B12, B21 and B22. FIG. 11 represents an output unit of an output of the rendering process corresponding to the input unit of FIG. 10. In an embodiment, for example, the output unit may include two red pixels r11 and r21, four green pixels g11, g12, g21 and g22 and two blue pixels b11 and b21.

Referring to FIGS. 1 to 11, the display panel 100 includes a first row first color pixel r11 and a first row second color pixel b11 disposed in a first row and a second row first color pixel r21 and a second row second color pixel b21 disposed in a second row. In an embodiment, for example, the first color pixels r11 and r21 may be red pixels and the second color pixels b11 and b21 may be blue pixels.

The display panel driver determines the grayscale values of the pixels of the display panel 100 based on the input image data IMG.

One of the first row first color pixel r11 and the second row first color pixel r21 is the normal pixel and the other is the viewing angle control pixel. One of the first row second color pixel b11 and the second row second color pixel b21 is the normal pixel and the other is the viewing angle control pixel.

In such an embodiment, a grayscale value of the first row first color pixel r11 is the same as a grayscale value of the second row first color pixel r21. A grayscale value of the first row second color pixel b11 is the same as a grayscale value of the second row second color pixel b21.

In addition, the display panel 100 may further include a first row third color pixel g11 and a second row third color pixel g21. In an embodiment, for example, the third color pixels g11 and g21 may be green pixels.

One of the first row third color pixel g11 and the second row third color pixel g21 is the normal pixel and the other is the viewing angle control pixel. A grayscale value of the first row third color pixel g11 may be the same as a grayscale value of the second row third color pixel g21.

In an embodiment, for example, the display panel 100 may include a 1-1 red pixel r11, a 1-1 green pixel g11, a 1-1 blue pixel b11 and a 1-2 green pixel g21 sequentially disposed in the first row and a 2-1 blue pixel b21, a 2-1 green pixel g21, a 2-1 red pixel r21 and a 2-2 green pixel g22 sequentially disposed in the second row.

The 1-1 red pixel r11 may be disposed adjacent to the 2-1 blue pixel b21 in the vertical direction. The 1-1 blue pixel b11 may be disposed adjacent to the 2-1 red pixel r21 in the vertical direction. The 1-1 green pixel g11 may be disposed adjacent to the 2-1 green pixel g21 in the vertical direction. The 1-2 green pixel g12 may be disposed adjacent to the 2-2 green pixel g22 in the vertical direction.

As described above, in the first row, a position in a vertical direction at which a light emitting area of the red pixel and a light emitting area of the blue pixel are disposed may be different from a position in the vertical direction at which the light emitting area of the green pixel is disposed in the first row. In an embodiment, for example, the position in the vertical direction at which the light emitting area of the red pixel and the light emitting area of the blue pixel are disposed may be higher than the position in the vertical direction at which the light emitting area of the green pixel is disposed in the first row. In the specification, as described above, a row including the 1-1 red pixel r11, the 1-1 green pixel g11, the 1-1 blue pixel b11 and the 1-2 green pixel g12, which are arranged in a zig-zag manner, may be defined as the first row.

In an embodiment, for example, the 1-1 red pixel r11 and the 2-1 blue pixel b21 are the normal pixels and the 1-1 blue pixel b11 and the 2-1 red pixel r21 are the viewing angle control pixels.

In an embodiment, for example, the 1-1 green pixel g11 and the 1-2 green pixel g12 are the viewing angle control pixels and the 2-1 green pixel g21 and the 2-2 green pixel g22 are the normal pixels.

In an embodiment, when grayscale values of the 1-1 red pixel, the 1-1 green pixel, the 1-1 blue pixel, the 1-2 green pixel, the 2-1 blue pixel, the 2-1 green pixel, the 2-1 red pixel and the 2-2 green pixel are r11, g11, b11, g12, b21, g21, r21 and g22, respectively, and grayscale values of the input image data IMG corresponding to the 1-1 red pixel, the 1-1 green pixel, the 1-1 blue pixel, the 1-2 green pixel, the 2-1 blue pixel, the 2-1 green pixel, the 2-1 red pixel and the 2-2 green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; and $g11=g12=g21=g22=(G11+G12+G21+G22)/4$ may be satisfied.

That is, in a block having two rows and two columns of FIG. 11, two red pixels r11 and r21 have a same grayscale value as each other, two blue pixels b11 and b21 have a same grayscale value as each other, and four green pixels g11, g12, g21 and g22 have a same grayscale value. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 red pixel, the 1-1 green pixel, the 1-1 blue pixel, the 1-2 green pixel, the 2-1 blue pixel, the 2-1 green pixel, the 2-1 red pixel and the 2-2 green pixel are r11, g11, b11, g12, b21, g21, r21 and g22, respectively, and grayscale values of the input image data IMG corresponding to the 1-1 red pixel, the 1-1 green pixel, the 1-1 blue pixel, the 1-2 green pixel, the 2-1 blue pixel, the 2-1 green pixel, the 2-1 red pixel and the 2-2 green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g21=(G11+G21)/2$; and $g12=g22=(G12+G22)/2$ may be satisfied.

That is, in a block having two rows and two columns of FIG. 11, two red pixels r11 and r21 have a same grayscale value as each other, and two blue pixels b11 and b21 have a same grayscale value as each other. Two green pixels g11 and g21 adjacent to each other in the vertical direction in a first column have a same grayscale value as each other, and two green pixels g12 and g22 adjacent to each other in the vertical direction in a second column have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 red pixel, the 1-1 green pixel, the 1-1 blue pixel, the 1-2 green pixel, the 2-1 blue pixel, the 2-1 green pixel, the 2-1 red pixel and the 2-2 green pixel are r11, g11, b11, g12, b21, g21, r21 and g22, respectively, and grayscale values of the input image data IMG corresponding to the 1-1 red pixel, the 1-1 green pixel, the 1-1 blue pixel, the 1-2 green pixel, the 2-1 blue pixel, the 2-1 green pixel, the 2-1 red pixel and the 2-2 green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g22=(G11+G22)/2$; and $g12=g21=(G12+G21)/2$ may be satisfied.

That is, in a block having two rows and two columns of FIG. 11, two red pixels r11 and r21 have a same grayscale value as each other, and two blue pixels b11 and b21 have a same grayscale value as each other. In addition, in the block having two rows and two columns, two green pixels g11 and g22 adjacent to each other in a first diagonal direction have a same grayscale value as each other, and two green pixels g12 and g21 adjacent to each other in a second diagonal direction have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

Figure 12:
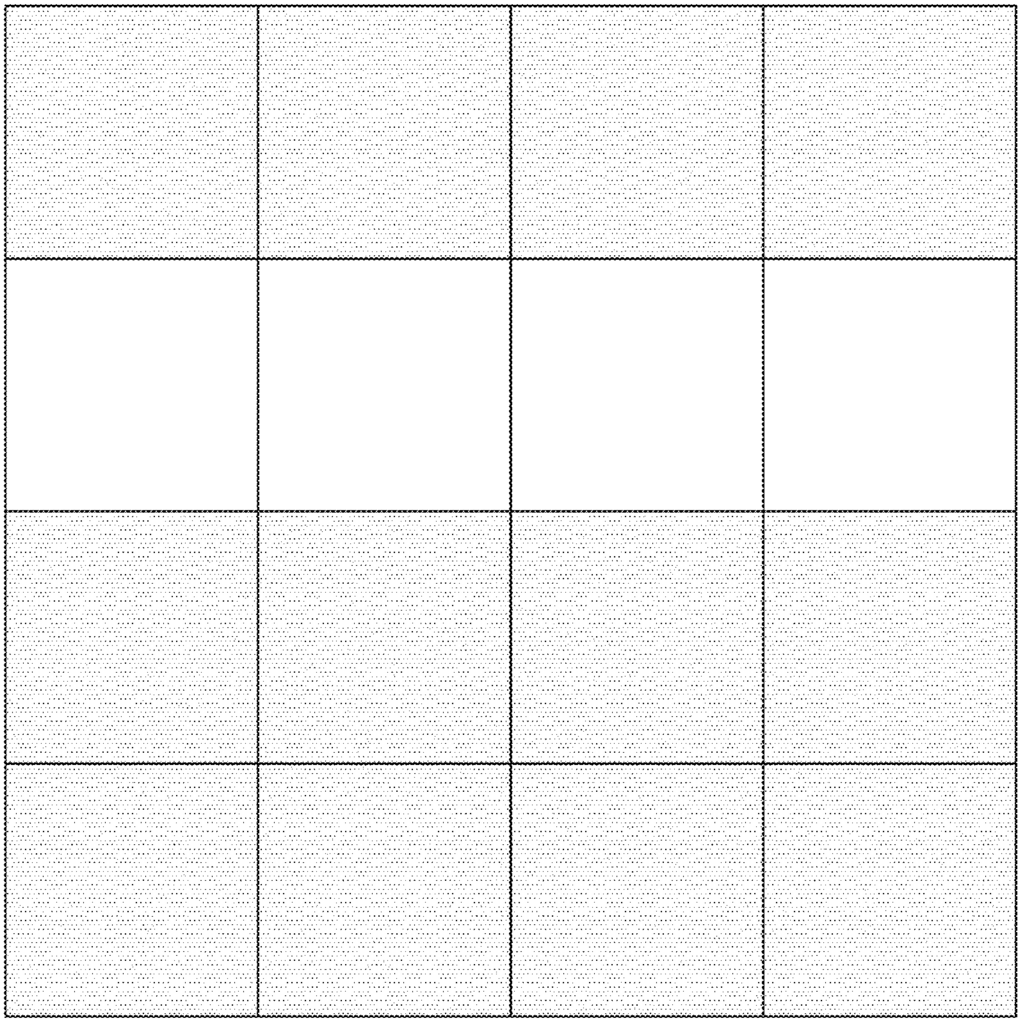
FIG. 12 is a conceptual diagram illustrating a third horizontal line pattern displayed by the display panel of FIG. 1.
Figure 13:
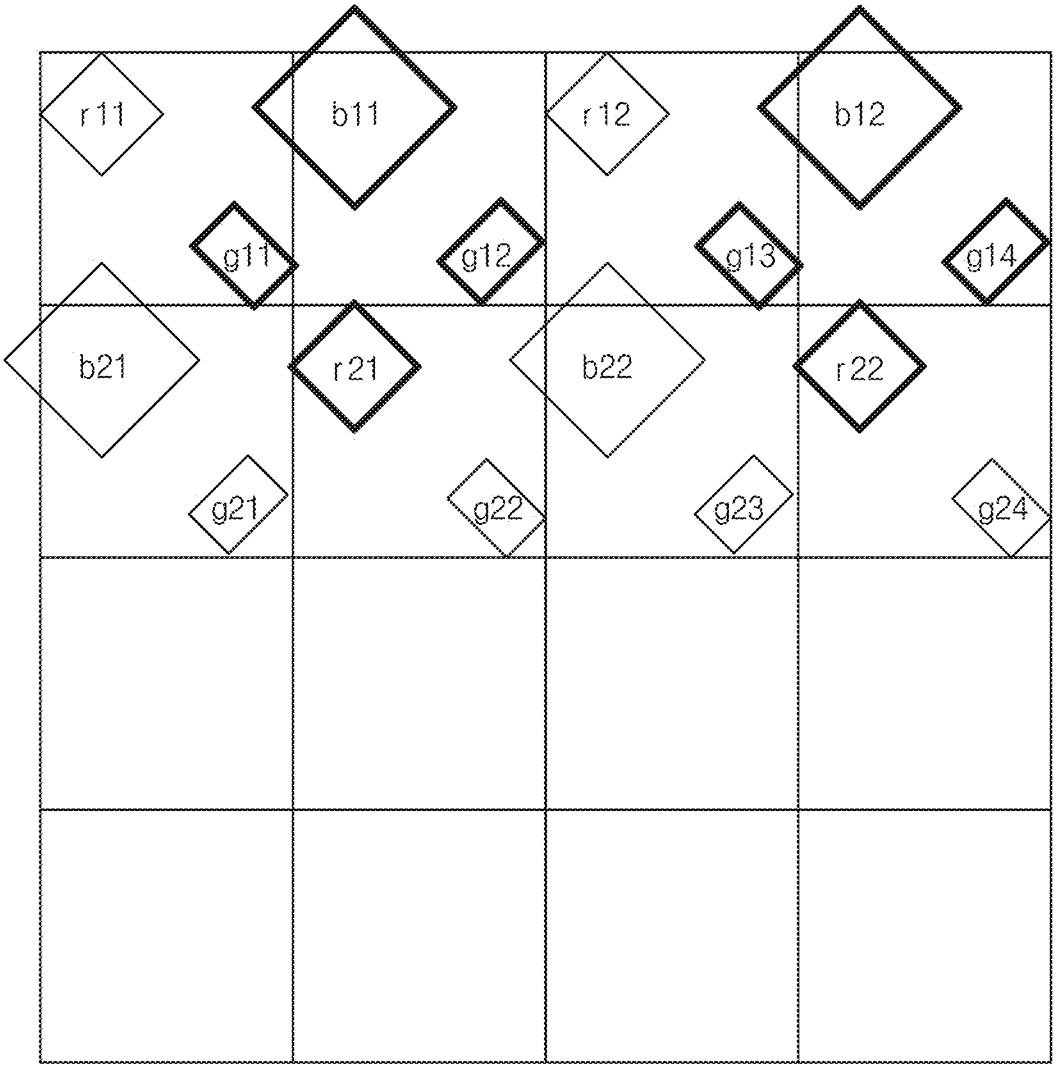
FIG. 13 is a conceptual diagram illustrating the third horizontal line pattern displayed by the display panel of FIG. 1 and the display panel is shown to a user from a front.
Figure 14:
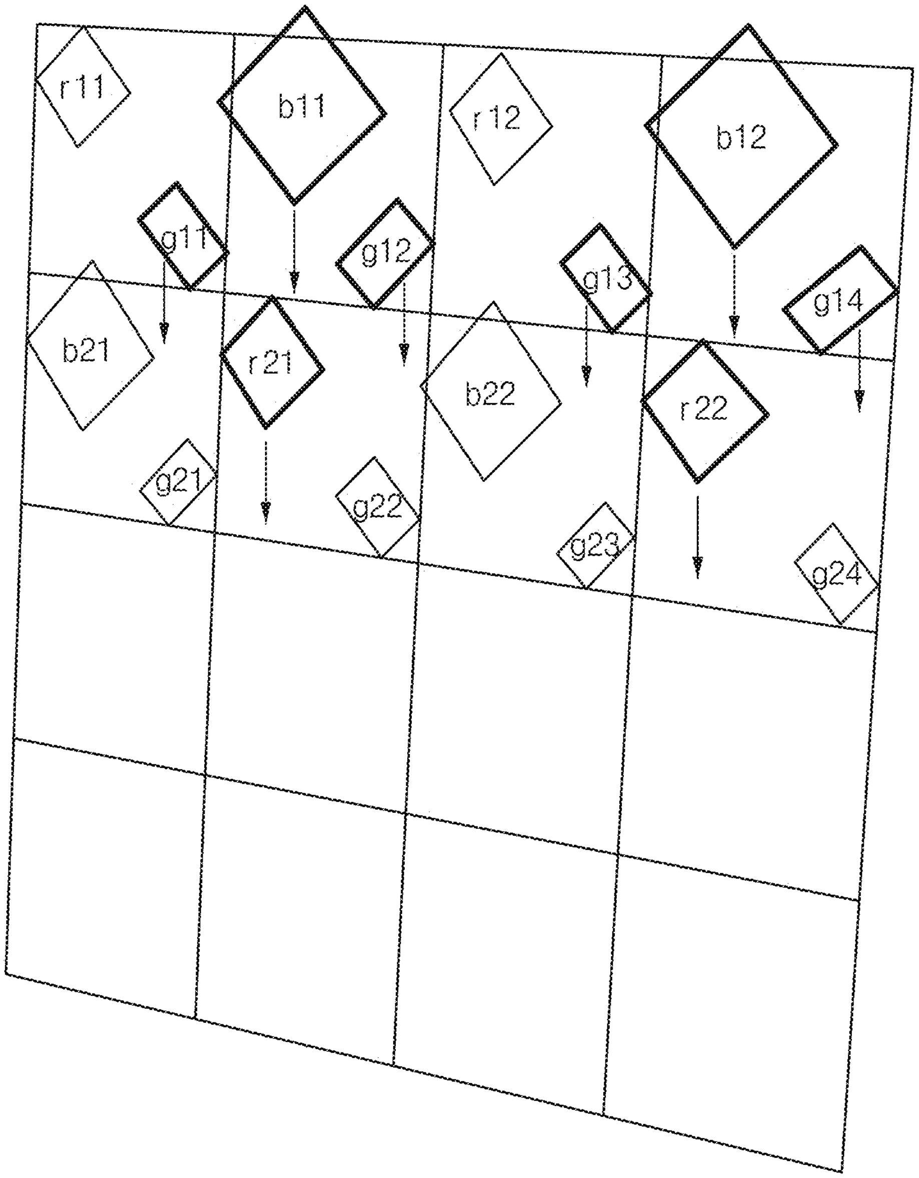
FIG. 14 is a conceptual diagram illustrating the third horizontal line pattern displayed by the display panel of FIG. 1 and the display panel is shown to a user from a side.

FIG. 12 is a conceptual diagram illustrating a third horizontal line pattern displayed by the display panel 100 of FIG. 1. FIG. 13 is a conceptual diagram illustrating the third horizontal line pattern displayed by the display panel 100 of FIG. 1 and the display panel 100 is shown to a user from a front. FIG. 14 is a conceptual diagram illustrating the third horizontal line pattern displayed by the display panel 100 of FIG. 1 and the display panel 100 is shown to a user from a side.

FIGS. 12 to 14 represent a case in which a color change defect in which colors are perceived differently from the front and from the side is prevented when a horizontal line pattern is displayed in the rendering method according to an embodiment of the invention.

In the rendering method according to an embodiment of the invention, grayscale values of pixels in a first row and a second row are generated using input image data for the first row and the second row and grayscale values of pixels in a third row and a fourth row are generated using input image data for the third row and the fourth row.

A second row displays a white image and a first row, a third row and a fourth row display a black image in the third horizontal line pattern of FIG. 12.

FIG. 13 shows a case of viewing the display panel 100 from the front, and the normal pixels r11, r12, b21, b22, g21, g22, g23 and g24 in the first row and the second row and the viewing angle control pixels b11, g11, g12, b12, g13, g14, r21 and r22 in the first row and the second row are brightly perceived at a desired luminance level so that the display panel 100 may display a white image well.

FIG. 14 shows a case of viewing the display panel 100 from the side, and the normal pixels r11, r12, b21, b22, g21, g22, g23 and g24 in the first row and the second row may be brightly perceived like the front luminance level but the viewing angle control pixels b11, g11, g12, b12, g13, g14, r21 and r22 in the first row and the second row may be perceived at a luminance level lower than the front luminance level. In such an embodiment, the configuration of normal pixels (2 red pixels, 2 blue pixels and 4 green pixels) and the configuration of viewing angle control pixels (2 red pixels, 2 blue pixels and 4 green pixels) are identical to each other within the first row and the second row which display the image after rendering. Thus, the third horizontal line pattern is shown as white from the front, and only appears as white with slightly reduced luminance but does not appear red or cyan from the side. Thus, a color of the front image and a color of the side image are perceived as the same so that the color change defect may be effectively prevented.

Figure 15:
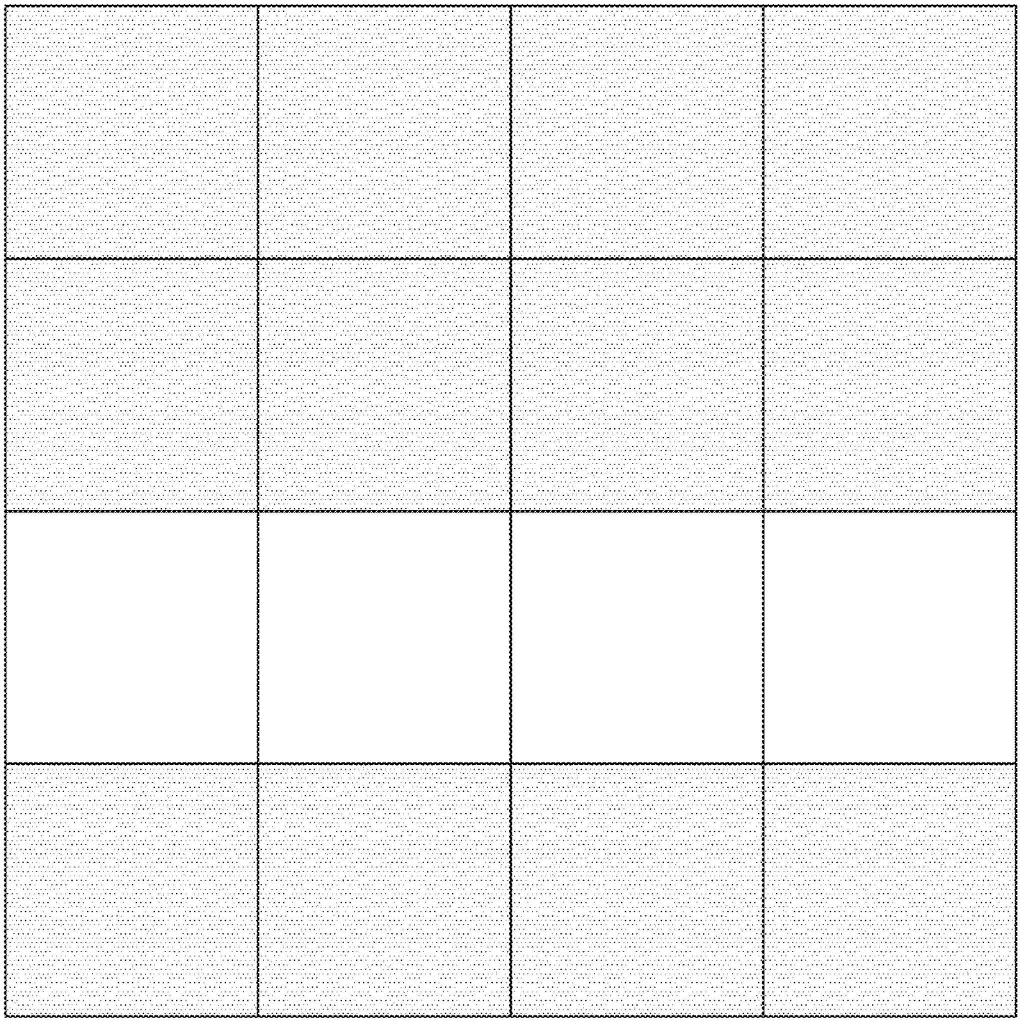
FIG. 15 is a conceptual diagram illustrating a fourth horizontal line pattern displayed by the display panel of FIG. 1.
Figure 16:
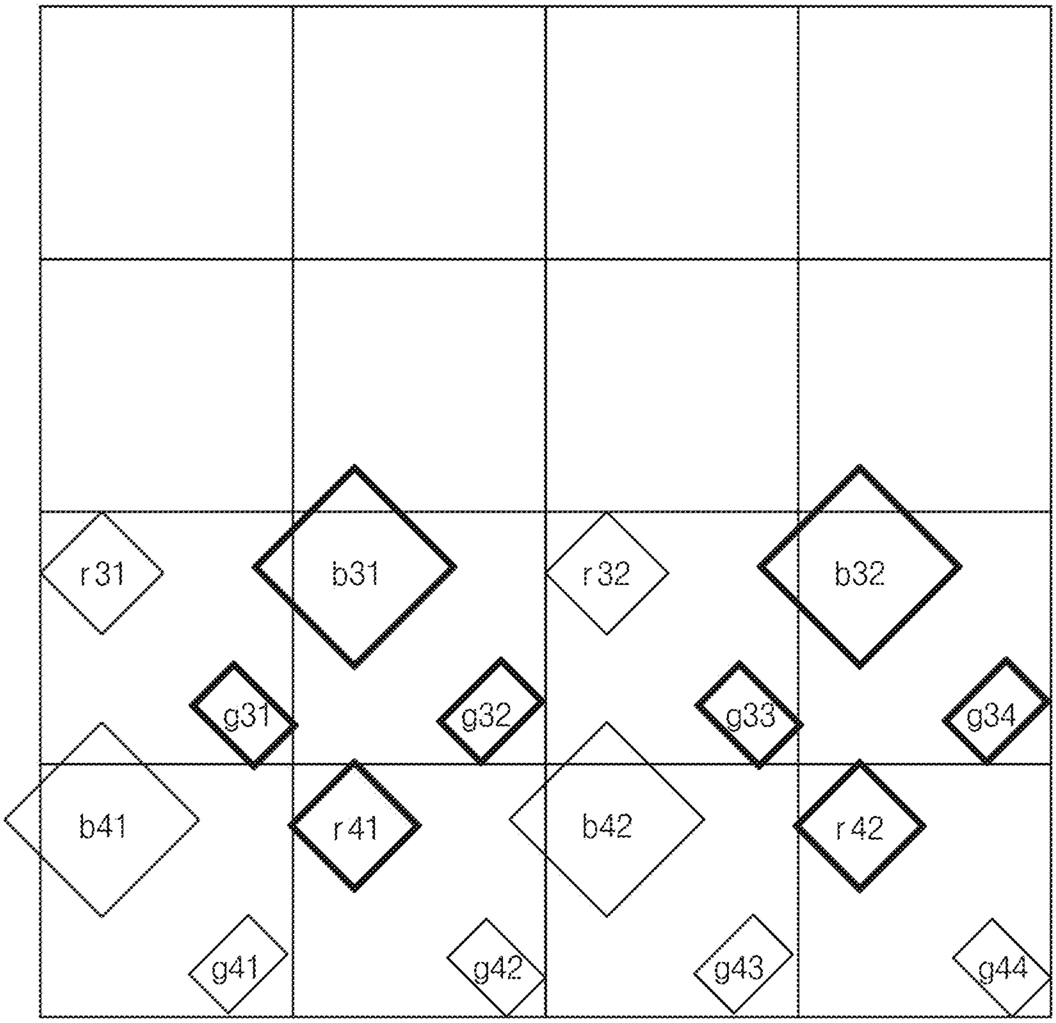
FIG. 16 is a conceptual diagram illustrating the fourth horizontal line pattern displayed by the display panel of FIG. 1 and the display panel is shown to a user from a front.
Figure 17:
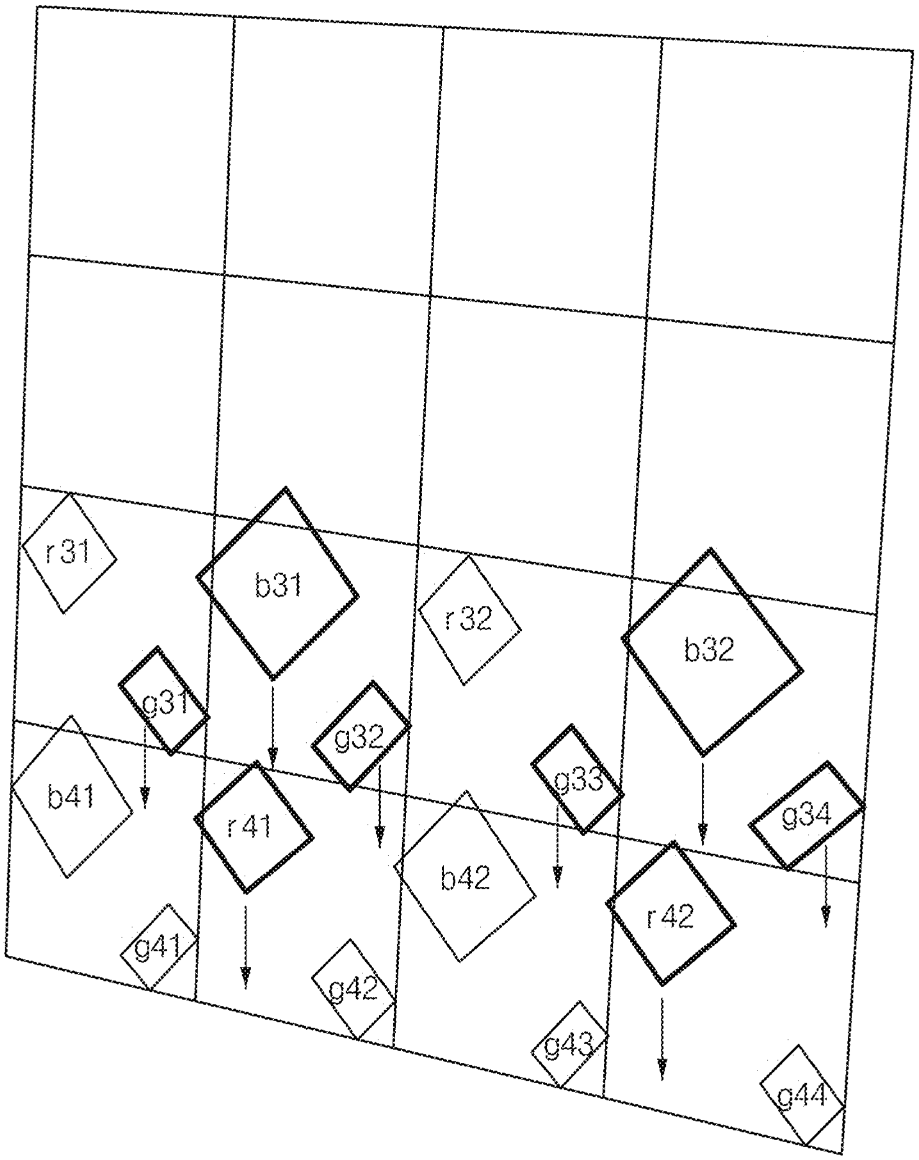
FIG. 17 is a conceptual diagram illustrating the fourth horizontal line pattern displayed by the display panel of FIG. 1 and the display panel is shown to a user from a side.

FIG. 15 is a conceptual diagram illustrating a fourth horizontal line pattern displayed by the display panel of FIG. 1. FIG. 16 is a conceptual diagram illustrating the fourth horizontal line pattern displayed by the display panel of FIG. 1 and the display panel is shown to a user from a front. FIG. 17 is a conceptual diagram illustrating the fourth horizontal line pattern displayed by the display panel of FIG. 1 and the display panel is shown to a user from a side.

FIGS. 15 to 17 represent a case in which a color change defect in which colors are perceived differently from the front and from the side is prevented when a horizontal line pattern is displayed in the rendering method according to an embodiment of the invention.

In the rendering method according to an embodiment of the invention, grayscale values of pixels in a first row and a second row are generated using input image data for the first row and the second row and grayscale values of pixels in a third row and a fourth row are generated using input image data for the third row and the fourth row.

A third row displays a white image and a first row, a second row and a fourth row display a black image in the fourth horizontal line pattern of FIG. 15.

FIG. 16 shows a case of viewing the display panel 100 from the front, and the normal pixels r31, r32, b41, b42, g41, g42, g43 and g44 in the third row and the fourth row and the viewing angle control pixels b31, g31, g32, b32, g33, g34, r41 and r42 in the third row and the fourth row are brightly perceived at a desired luminance level so that the display panel 100 may display a white image well.

FIG. 17 shows a case of viewing the display panel 100 from the side, and the normal pixels r31, r32, b41, b42, g41, g42, g43 and g44 in the third row and the fourth row may be brightly perceived like the front luminance level but the viewing angle control pixels b31, g31, g32, b32, g33, g34, r41 and r42 in the third row and the fourth row may be perceived at a luminance level lower than the front luminance level. In the embodiment, the configuration of normal pixels (2 red pixels, 2 blue pixels and 4 green pixels) and the configuration of viewing angle control pixels (2 red pixels, 2 blue pixels and 4 green pixels) are identical to each other within the third row and the fourth row which display the image after rendering. Thus, the fourth horizontal line pattern is shown as white from the front, and only appears as white with slightly reduced luminance but does not appear red or cyan from the side. Thus, a color of the front image and a color of the side image are perceived as the same so that the color change defect may be effectively prevented.

Figure 19:
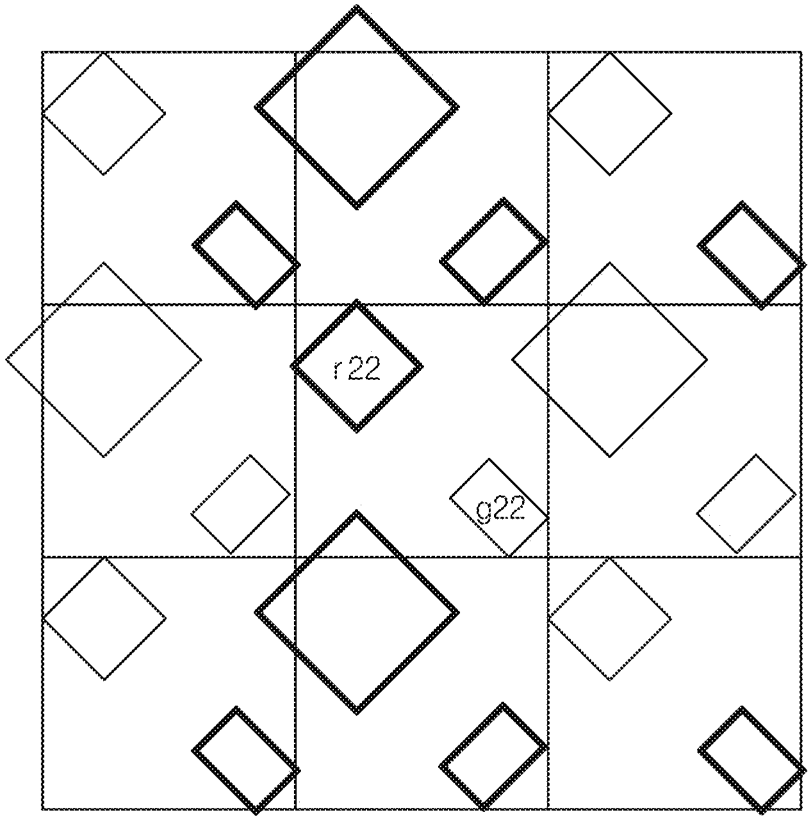

FIGS. 18 and 19 are conceptual diagrams illustrating a rendering process of the driving controller 200 of FIG. 1 according to an embodiment of the invention.

In an embodiment, the rendering concept of the pixels in two rows and two columns which is described above referring to FIGS. 10 and 11 may be further applied to pixels in three rows and three columns.

FIG. 18 represents an input unit of an input of the rendering process. In an embodiment, for example, the input unit may include nine red grayscale values R11, R12, R13, R21, R22, R23, R31, R32 and R33, nine green grayscale values G11, G12, G13, G21, G22, G23, G31, G32 and G33 and nine blue grayscale values B11, B12, B13, B21, B22, B23, B31, B32 and B33. FIG. 19 represents an output unit of an output of the rendering process corresponding to the input unit of FIG. 18.

Referring to FIGS. 1 to 19, the display panel 100 may include a red pixel and a green pixel disposed in a first first block, a blue pixel and a green pixel disposed in a second first block, a red pixel and a green pixel disposed in a third first block, a blue pixel and a green pixel disposed in a first second block, a red pixel and a green pixel disposed in a second second block, a blue pixel and a green pixel disposed in a third second block, a red pixel and a green pixel disposed in a first third block, a blue pixel and a green pixel disposed in a second third block and a red pixel and a green pixel disposed in a third third block.

When grayscale values of the input image data IMG corresponding to the first first block, the second first block, the third first block, the first second block, the second second block, the third second block, the first third block, the second third block and the third third block are R11, G11, B11, R12, G12, B12, R13, G13, B13, R21, G21, B21, R22, G22, B22, R23, G23, B23, R31, G31, B31, R32, G32, B32, R33, G33 and B33, respectively, the grayscale value of the red pixel in the second second block is r22, and the grayscale value of the green pixel in the second second block is g22, the following equations: $r22=R11*F1+R12*F2+R13*F3+R21*F4+R22*F5+R23*F6+R31*F7+R32*F8+R33*F9$; $g22=G11*F1+G12*F2+G13*F3+G21*F4+G22*F5+G23*F6+G31*F7+G32*F8+G33*F9$; and $F1+F2+F3+F4+F5+F6+F7+F8+F9=1$ are satisfied.

Herein, each of F1 to F9 may be equal to or greater than zero and equal to less than one. The color change defect due to the difference between a color of the front image and a color of the side image may be effectively prevented by properly setting F1 to F9.

According to embodiments of the invention, the rendering process may be operated in a way such that the red pixel in the first row and the red pixel in the second row have a same grayscale value as each other and the blue pixel in the first row and the blue pixel in the second row have a same grayscale value as each other. Thus, when the display apparatus including the normal pixel and the viewing angle control pixel displays the horizontal line pattern in the normal mode, the color change defect in which colors are perceived differently from the front and from the side may be effectively prevented so that the display quality of the display panel 100 may be enhanced.

Figure 20:
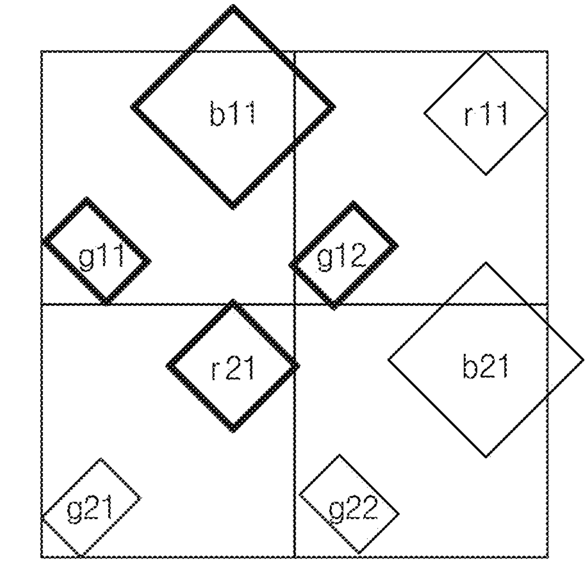
FIG. 20 is a conceptual diagram illustrating a pixel structure of a display panel and a rendering process of a driving controller according to an embodiment of the invention.

FIG. 20 is a conceptual diagram illustrating a pixel structure of a display panel 100 and a rendering process of a driving controller 200 according to an embodiment of the invention.

The display apparatus according to an embodiment of FIG. 20 is substantially the same as the display apparatus according to the embodiments described above referring to FIGS. 1 to 19 except for the structure of the pixels. Thus, the same reference numerals will be used to refer to the same or like parts as those used to describe the embodiments of FIGS. 1 to 19, and any repetitive detailed description thereof will be omitted.

Referring to FIGS. 1, 2, 10 and 20, an embodiment of the display panel 100 may include a 1-1 green pixel g11, a 1-1 blue pixel b11, a 1-2 green pixel g12 and a 1-1 red pixel r11 which are sequentially disposed in a first row.

In the first row, a position in a vertical direction at which a light emitting area of the red pixel and a light emitting area of the blue pixel are disposed may be different from a position in the vertical direction at which the light emitting area of the green pixel is disposed in the first row. In an embodiment, for example, the position in the vertical direction at which the light emitting area of the red pixel and the light emitting area of the blue pixel are disposed may be higher than the position in the vertical direction at which the light emitting area of the green pixel is disposed in the first row. In the specification, a row including the 1-1 green pixel g11, the 1-1 blue pixel b11, the 1-2 green pixel g12 and the 1-1 red pixel r11, which are arranged in a zig-zag manner, may be defined as the first row.

The display panel 100 may include a 2-1 green pixel g21, a 2-1 red pixel r21, a 2-2 green pixel g22 and a 2-1 blue pixel b21 which are sequentially disposed in a second row.

In an embodiment of the display panel 100, one light emitting area of the red pixel, one light emitting area of the blue pixel, and two light emitting areas of the green pixels may be disposed in a diamond shape. In an embodiment, for example, the 1-1 blue pixel b11, the 1-1 green pixel g11, the 1-2 green pixel g12 and the 2-1 red pixel r21 may be disposed in a diamond shape.

The display panel 100 may include a normal pixel and a viewing angle control pixel. A side luminance of the viewing angle control pixel perceived by a user from a side may be less than a front luminance of the viewing angle control pixel perceived by a user from a front.

A front luminance of the normal pixel perceived by a user from a front may be substantially the same as a front luminance of the viewing angle control pixel perceived by a user from a front. A side luminance of the normal pixel perceived by a user from a side may be greater than a side luminance of the viewing angle control pixel perceived by a user from a side.

The front luminance of the normal pixel may be substantially the same as the side luminance of the normal pixel. However, the front luminance of the viewing angle control pixel may be greater than the side luminance of the viewing angle control pixel. In an embodiment, for example, the side luminance of the viewing angle control pixel may be equal to or less than a half of the front luminance of the viewing angle control pixel.

In FIG. 20, a pixel drawn to have a relatively thin border may be the normal pixel and a pixel drawn to have a relatively thick border may be the viewing angle control pixel.

The 1-1 red pixel r11 and the 2-1 blue pixel b21 are the normal pixels and the 1-1 blue pixel b11 and the 2-1 red pixel r21 are the viewing angle control pixels, the 1-1 green pixel g11 and the 1-2 green pixel g12 are the viewing angle control pixels and the 2-1 green pixel g21 and the 2-2 green pixel g22 are the normal pixels.

In an embodiment, when grayscale values of the 1-1 green pixel, the 1-1 blue pixel, the 1-2 green pixel, the 1-1 red pixel, the 2-1 green pixel, the 2-1 red pixel, the 2-2 green pixel and the 2-1 blue pixel are g11, b11, g12, r11, g21, r21, g22 and b21, respectively, and grayscale values of the input image data IMG corresponding to the 1-1 green pixel, the 1-1 blue pixel, the 1-2 green pixel, the 1-1 red pixel, the 2-1 green pixel, the 2-1 red pixel, the 2-2 green pixel and the 2-1 blue pixel are R11, G11, B11, R12, G12, B12, R21, G21, B21, R22, G22 and B22, r11=r21=(R11+R12+R21+R22)/4, respectively, the following equations: b11=b21=(B11+B12+B21+B22)/4; and g11=g12=g21=g22=(G11+G12+G21+G22)/4 may be satisfied.

That is, in a block having two rows and two columns of FIG. 20, two red pixels r11 and r21 have a same grayscale value as each other, two blue pixels b11 and b21 have a same grayscale value as each other, and four green pixels g11, g12, g21 and g22 have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 green pixel, the 1-1 blue pixel, the 1-2 green pixel, the 1-1 red pixel, the 2-1 green pixel, the 2-1 red pixel, the 2-2 green pixel and the 2-1 blue pixel are g11, b11, g12, r11, g21, r21, g22 and b21, respectively, and grayscale values of the input image data IMG corresponding to the 1-1 green pixel, the 1-1 blue pixel, the 1-2 green pixel, the 1-1 red pixel, the 2-1 green pixel, the 2-1 red pixel, the 2-2 green pixel and the 2-1 blue pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; g11=g21=(G11+G21)/2; and g12=g22=(G12+G22)/2 may be satisfied.

That is, in a block having two rows and two columns of FIG. 20, two red pixels r11 and r21 have a same grayscale value as each other, and two blue pixels b11 and b21 have a same grayscale value as each other. Two green pixels g11 and g21 adjacent to each other in the vertical direction in a first column have a same grayscale value as each other, and two green pixels g12 and g22 adjacent to each other in the vertical direction in a second column have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 green pixel, the 1-1 blue pixel, the 1-2 green pixel, the 1-1 red pixel, the 2-1 green pixel, the 2-1 red pixel, the 2-2 green pixel and the 2-1 blue pixel are g11, b11, g12, r11, g21, r21, g22 and b21, respectively, and grayscale values of the input image data IMG corresponding to the 1-1 green pixel, the 1-1 blue pixel, the 1-2 green pixel, the 1-1 red pixel, the 2-1 green pixel, the 2-1 red pixel, the 2-2 green pixel and the 2-1 blue pixel are R11, G11, B11, R12, G12, B12, R21, G21, B21, R22, G22 and B22, respectively, the following equation: r11=r21=(R11+R12+R21+R22)/4; b11=b21=(B11+B12+B21+B22)/4; g11=g22=(G11+G22)/2; and g12=g21=(G12+G21)/2 may be satisfied.

That is, in a block having two rows and two columns of FIG. 20, two red pixels r11 and r21 have a same grayscale value as each other, and two blue pixels b11 and b21 have a same grayscale value as each other. In addition, in the block having two rows and two columns, two green pixels g11 and g22 adjacent to each other in a first diagonal direction have a same grayscale value as each other, and two green pixels g12 and g21 adjacent to each other in a second diagonal direction have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

According to an embodiment of the invention, the rendering process may be operated in a way such that the red pixel in the first row and the red pixel in the second row have a same grayscale value as each other, and the blue pixel in the first row and the blue pixel in the second row have a same grayscale value as each other. Thus, when the display apparatus including the normal pixel and the viewing angle control pixel displays the horizontal line pattern in the normal mode, the color change defect in which colors are perceived differently from the front and from the side may be effectively prevented so that the display quality of the display panel 100 may be enhanced.

Figure 21:
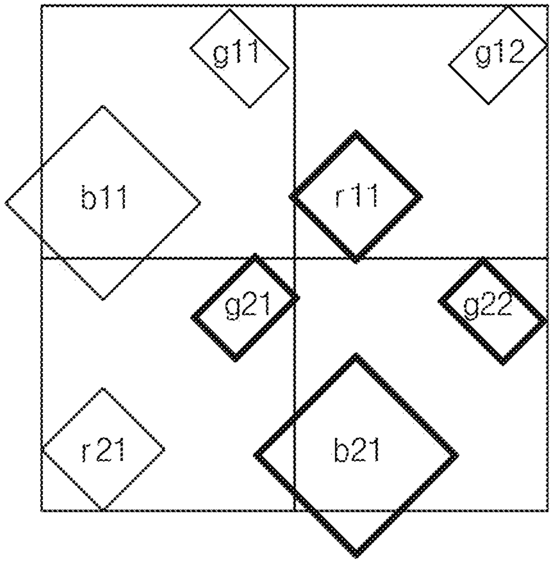
FIG. 21 is a conceptual diagram illustrating a pixel structure of a display panel and a rendering process of a driving controller according to an embodiment of the invention.

FIG. 21 is a conceptual diagram illustrating a pixel structure of a display panel 100 and a rendering process of a driving controller 200 according to an embodiment of the invention.

The display apparatus according to an embodiment of FIG. 21 is substantially the same as the display apparatus according to the embodiments described above referring to FIGS. 1 to 19 except for the structure of the pixels. Thus, the same reference numerals will be used to refer to the same or like parts as those used to describe the embodiments of FIGS. 1 to 19, and any repetitive detailed description thereof will be omitted.

Referring to FIGS. 1, 2, 10 and 21, an embodiment of the display panel 100 may include a 1-1 blue pixel b11, a 1-1 green pixel g11, a 1-1 red pixel r11 and a 1-2 green pixel g12 which are sequentially disposed in a first row.

In the first row, a position in a vertical direction at which a light emitting area of the red pixel and a light emitting area of the blue pixel are disposed may be different from a position in the vertical direction at which the light emitting area of the green pixel is disposed in the first row. In an embodiment, for example, the position in the vertical direction at which the light emitting area of the red pixel and the light emitting area of the blue pixel are disposed may be lower (or disposed further downwardly) than the position in the vertical direction at which the light emitting area of the green pixel is disposed in the first row. In the specification, a row including the 1-1 blue pixel b11, the 1-1 green pixel g11, the 1-1 red pixel r11 and the 1-2 green pixel g12, which are arranged in a zig-zag manner, may be defined as the first row.

The display panel 100 may include a 2-1 red pixel r21, a 2-1 green pixel g21, a 2-1 blue pixel b21 and a 2-2 green pixel g22 which are sequentially disposed in a second row.

In an embodiment of the display panel 100, one light emitting area of the red pixel, one light emitting area of the blue pixel, and two light emitting areas of the green pixels may be disposed in a diamond shape. In an embodiment, for example, the 1-1 red pixel r11, the 2-1 green pixel g21, the 2-2 green pixel g22 and the 2-1 blue pixel b21 may be disposed in a diamond shape.

The display panel 100 may include a normal pixel and a viewing angle control pixel. A side luminance of the viewing angle control pixel perceived by a user from a side may be less than a front luminance of the viewing angle control pixel perceived by a user from a front.

A front luminance of the normal pixel perceived by a user from a front may be substantially the same as a front luminance of the viewing angle control pixel perceived by a user from a front. A side luminance of the normal pixel perceived by a user from a side may be greater than a side luminance of the viewing angle control pixel perceived by a user from a side.

The front luminance of the normal pixel may be substantially the same as the side luminance of the normal pixel. However, the front luminance of the viewing angle control pixel may be greater than the side luminance of the viewing angle control pixel. In an embodiment, for example, the side luminance of the viewing angle control pixel may be equal to or less than a half of the front luminance of the viewing angle control pixel.

In FIG. 21, a pixel drawn to have a relatively thin border may be the normal pixel and a pixel drawn to have a relatively thick border may be the viewing angle control pixel.

The 1-1 blue pixel b11 and the 2-1 red pixel r21 are the normal pixels and the 1-1 red pixel r11 and the 2-1 blue pixel b21 are the viewing angle control pixels, the 1-1 green pixel g11 and the 1-2 green pixel g12 are the normal pixels and the 2-1 green pixel g21 and the 2-2 green pixel g22 are the viewing angle control pixels.

In an embodiment, when grayscale values of the 1-1 blue pixel, the 1-1 green pixel, the 1-1 red pixel, the 1-2 green pixel, the 2-1 red pixel, the 2-1 green pixel, the 2-1 blue pixel and the 2-2 green pixel are b11, g11, r11, g12, r21, g21, b21 and g22, respectively, and grayscale values of the input image data IMG corresponding to the 1-1 blue pixel, the 1-1 green pixel, the 1-1 red pixel, the 1-2 green pixel, the 2-1 red pixel, the 2-1 green pixel, the 2-1 blue pixel and the 2-2 green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; and $g11=g12=g21=g22=(G11+G12+G21+G22)/4$ may be satisfied.

That is, in a block having two rows and two columns of FIG. 21, two red pixels r11 and r21 have a same grayscale value as each other, two blue pixels b11 and b21 have a same grayscale value as each other, and four green pixels g11, g12, g21 and g22 have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 blue pixel, the 1-1 green pixel, the 1-1 red pixel, the 1-2 green pixel, the 2-1 red pixel, the 2-1 green pixel, the 2-1 blue pixel and the 2-2 green pixel are b11, g11, r11, g12, r21, g21, b21 and g22, respectively, and grayscale values of the input image data IMG corresponding to the 1-1 blue pixel, the 1-1 green pixel, the 1-1 red pixel, the 1-2 green pixel, the 2-1 red pixel, the 2-1 green pixel, the 2-1 blue pixel and the 2-2 green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g21=(G11+G21)/2$; and $g12=g22=(G12+G22)/2$ may be satisfied.

That is, in a block having two rows and two columns of FIG. 21, two red pixels r11 and r21 have a same grayscale value as each other, and two blue pixels b11 and b21 have a same grayscale value as each other. Two green pixels g11 and g21 adjacent to each other in the vertical direction in a first column have a same grayscale value as each other, and two green pixels g12 and g22 adjacent to each other in the vertical direction in a second column have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 blue pixel, the 1-1 green pixel, the 1-1 red pixel, the 1-2 green pixel, the 2-1 red pixel, the 2-1 green pixel, the 2-1 blue pixel and the 2-2 green pixel are b11, g11, r11, g12, r21, g21, b21 and g22, respectively, and grayscale values of the input image data IMG corresponding to the 1-1 blue pixel, the 1-1 green pixel, the 1-1 red pixel, the 1-2 green pixel, the 2-1 red pixel, the 2-1 green pixel, the 2-1 blue pixel and the 2-2 green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g22=(G11+G22)/2$; and $g12=g21=(G12+G21)/2$ may be satisfied.

That is, in a block having two rows and two columns of FIG. 21, two red pixels r11 and r21 have a same grayscale value as each other, and two blue pixels b11 and b21 have a same grayscale value as each other. In addition, in the block having two rows and two columns, two green pixels g11 and g22 adjacent to each other in a first diagonal direction have a same grayscale value as each other, and two green pixels g12 and g21 adjacent to each other in a second diagonal direction have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

According to the embodiment, the rendering process may be operated in a way such that the red pixel in the first row and the red pixel in the second row have a same grayscale value as each other and the blue pixel in the first row and the blue pixel in the second row have a same grayscale value as each other. Thus, when the display apparatus including the normal pixel and the viewing angle control pixel displays the horizontal line pattern in the normal mode, the color change defect in which colors are perceived differently from the front and from the side may be effectively prevented so that the display quality of the display panel 100 may be enhanced.

Figure 22:
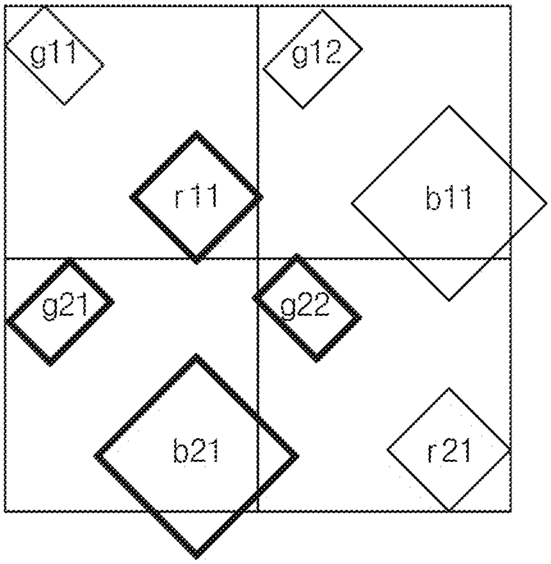
FIG. 22 is a conceptual diagram illustrating a pixel structure of a display panel and a rendering process of a driving controller according to an embodiment of the invention.

FIG. 22 is a conceptual diagram illustrating a pixel structure of a display panel 100 and a rendering process of a driving controller 200 according to an embodiment of the invention.

The display apparatus according to an embodiment of FIG. 22 is substantially the same as the display apparatus according to the embodiments described above referring to FIGS. 1 to 19 except for the structure of the pixels. Thus, the same reference numerals will be used to refer to the same or like parts as those used to describe the embodiments of FIGS. 1 to 19, and any repetitive detailed description thereof will be omitted.

Referring to FIGS. 1, 2, 10 and 22, an embodiment of the display panel 100 may include a 1-1 green pixel g11, a 1-1 red pixel r11, a 1-2 green pixel g12 and a 1-1 blue pixel b11 which are sequentially disposed in a first row.

In the first row, a position in a vertical direction at which a light emitting area of the red pixel and a light emitting area of the blue pixel are disposed may be different from a position in the vertical direction at which the light emitting area of the green pixel is disposed in the first row. In an embodiment, for example, the position in the vertical direction at which the light emitting area of the red pixel and the light emitting area of the blue pixel are disposed may be lower than the position in the vertical direction at which the light emitting area of the green pixel is disposed in the first row. In the specification, a row including the 1-1 green pixel g11, the 1-1 red pixel r11, the 1-2 green pixel g12 and the 1-1 blue pixel b11, which are arranged in a zig-zag manner, may be defined as the first row.

The display panel 100 may include a 2-1 green pixel g21, a 2-1 blue pixel b21, a 2-2 green pixel g22 and a 2-1 red pixel r21 which are sequentially disposed in a second row.

In the display panel 100, one light emitting area of the red pixel, one light emitting area of the blue pixel, and two light emitting areas of the green pixels may be disposed in a diamond shape. In an embodiment, for example, r11, g21, g22 and b21 may be disposed in a diamond shape.

The display panel 100 may include a normal pixel and a viewing angle control pixel. A side luminance of the viewing angle control pixel perceived by a user from a side may be less than a front luminance of the viewing angle control pixel perceived by a user from a front.

A front luminance of the normal pixel perceived by a user from a front may be substantially the same as a front luminance of the viewing angle control pixel perceived by a user from a front. A side luminance of the normal pixel perceived by a user from a side may be greater than a side luminance of the viewing angle control pixel perceived by a user from a side.

The front luminance of the normal pixel may be substantially the same as the side luminance of the normal pixel. However, the front luminance of the viewing angle control pixel may be greater than the side luminance of the viewing angle control pixel. In an embodiment, for example, the side luminance of the viewing angle control pixel may be equal to or less than a half of the front luminance of the viewing angle control pixel.

In FIG. 22, a pixel drawn to have a relatively thin border may be the normal pixel and a pixel drawn to have a relatively thick border may be the viewing angle control pixel.

The 1-1 blue pixel b11 and the 2-1 red pixel r21 are the normal pixels and the 1-1 red pixel r11 and the 2-1 blue pixel b21 are the viewing angle control pixels, the 1-1 green pixel g11 and the 1-2 green pixel g12 are the normal pixels and the 2-1 green pixel g21 and the 2-2 green pixel g22 are the viewing angle control pixels.

In an embodiment, when grayscale values of the 1-1 green pixel, the 1-1 red pixel, the 1-2 green pixel, the 1-1 blue pixel, the 2-1 green pixel, the 2-1 blue pixel, the 2-2 green pixel and the 2-1 red pixel are g11, r11, g12, b11, g21, b21, g22 and r21, respectively, and grayscale values of the input image data IMG corresponding to the 1-1 green pixel, the 1-1 red pixel, the 1-2 green pixel, the 1-1 blue pixel, the 2-1 green pixel, the 2-1 blue pixel, the 2-2 green pixel and the 2-1 red pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; and $g11=g12=g21=g22=(G11+G12+G21+G22)/4$ may be satisfied.

That is, in a block having two rows and two columns of FIG. 22, two red pixels r11 and r21 have a same grayscale value as each other, two blue pixels b11 and b21 have a same grayscale value as each other, and four green pixels g11, g12, g21 and g22 have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 green pixel, the 1-1 red pixel, the 1-2 green pixel, the 1-1 blue pixel, the 2-1 green pixel, the 2-1 blue pixel, the 2-2 green pixel and the 2-1 red pixel are g11, r11, g12, b11, g21, b21, g22 and r21, respectively, and grayscale values of the input image data IMG corresponding to the 1-1 green pixel, the 1-1 red pixel, the 1-2 green pixel, the 1-1 blue pixel, the 2-1 green pixel, the 2-1 blue pixel, the 2-2 green pixel and the 2-1 red pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g21=(G11+G21)/2$; and $g12=g22=(G12+G22)/2$ may be satisfied.

That is, in a block having two rows and two columns of FIG. 22, two red pixels r11 and r21 have a same grayscale value as each other, and two blue pixels b11 and b21 have a same grayscale value as each other. Two green pixels g11 and g21 adjacent to each other in the vertical direction in a first column have a same grayscale value as each other, and two green pixels g12 and g22 adjacent to each other in the vertical direction in a second column have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

In an embodiment, when grayscale values of the 1-1 green pixel, the 1-1 red pixel, the 1-2 green pixel, the 1-1 blue pixel, the 2-1 green pixel, the 2-1 blue pixel, the 2-2 green pixel and the 2-1 red pixel are g11, r11, g12, b11, g21, b21, g22 and r21, respectively, and grayscale values of the input image data IMG corresponding to the 1-1 green pixel, the 1-1 red pixel, the 1-2 green pixel, the 1-1 blue pixel, the 2-1 green pixel, the 2-1 blue pixel, the 2-2 green pixel and the 2-1 red pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g22=(G11+G22)/2$; and $g12=g21=(G12+G21)/2$ may be satisfied.

That is, in a block having two rows and two columns of FIG. 22, two red pixels r11 and r21 have a same grayscale value as each other, and two blue pixels b11 and b21 have a same grayscale value as each other. In addition, in the block having two rows and two columns, two green pixels g11 and g22 adjacent to each other in a first diagonal direction have a same grayscale value as each other, and two green pixels g12 and g21 adjacent to each other in a second diagonal direction have a same grayscale value as each other. As described above, in the block having two rows and two columns, the grayscale value of the normal pixel and the grayscale value of the viewing angle control pixel may be rendered by a same value so that the color change defect due to the difference between a color of the front image and a color of the side image may be effectively prevented.

According to an embodiment, the rendering process may be operated in a way such that the red pixel in the first row and the red pixel in the second row have a same grayscale value as each other and the blue pixel in the first row and the blue pixel in the second row have a same grayscale value as each other. Thus, when the display apparatus including the normal pixel and the viewing angle control pixel displays the horizontal line pattern in the normal mode, the color change defect in which colors are perceived differently from the front and from the side may be effectively prevented so that the display quality of the display panel 100 may be enhanced.

In embodiments of the display apparatus and the method of driving the display panel according to the invention, when the display apparatus including the viewing angle control pixel displays the horizontal line pattern, the color change defect may be effectively prevented so that the display quality of the display panel may be enhanced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel including a first row first color pixel and a first row second color pixel, which are disposed in a first row, and a second row first color pixel and a second row second color pixel, which are disposed in a second row; and a display panel driver which determines a grayscale value of a pixel of the display panel based on input image data, wherein one of the first row first color pixel and the second row first color pixel is a normal pixel and the other of the first row first color pixel and the second row first color pixel is a viewing angle control pixel, wherein one of the first row second color pixel and the second row second color pixel is the normal pixel and the other of the first row second color pixel and the second row second color pixel is the viewing angle control pixel, wherein a grayscale value of the first row first color pixel is the same as a grayscale value of the second row first color pixel, wherein a grayscale value of the first row second color pixel is the same as a grayscale value of the second row second color pixel, wherein the display panel driver operates a rendering process to determine grayscale values of the pixels such that the grayscale value of the first row first color pixel is the same as the grayscale value of the second row first color pixel, and the grayscale value of the first row second color pixel is the same as the grayscale value of the second row second color pixel, wherein the rendering process prevents a color change defect in which colors are perceived differently from a front viewing angle and from a side viewing angle, thereby enhancing a display quality of the display panel, and wherein the rendering process determines the grayscale value of the first row first color pixel and the grayscale value of the second row first color pixel to be the same, and the grayscale value of the first row second color pixel and the grayscale value of the second row second color pixel to be the same, even when the input image data for the first row first color pixel and the second row first color pixel are different, and even when the input image data for the first row second color pixel and the second row second color pixel are different.

2. The display apparatus of claim 1, wherein the display panel further comprises a first row third color pixel and a second row third color pixel, wherein one of the first row third color pixel and the second row third color pixel is the normal pixel and the other of the first row third color pixel and the second row third color pixel is the viewing angle control pixel, and wherein a grayscale value of the first row third color pixel is the same as a grayscale value of the second row third color pixel.

3. The display apparatus of claim 1, wherein the display panel includes a first first red pixel, a first first green pixel, a first first blue pixel and a second first green pixel sequentially disposed in the first row and a first second blue pixel, a first second green pixel, a first second red pixel and a second second green pixel, which are sequentially disposed in the second row.

4. The display apparatus of claim 3, wherein each of the first first red pixel and the first second blue pixel is the normal pixel, and wherein each of the first first blue pixel and the first second red pixel is the viewing angle control pixel.

5. The display apparatus of claim 4, wherein each of the first first green pixel and the second first green pixel is the viewing angle control pixel, and wherein each of the first second green pixel and the second second green pixel is the normal pixel.

6. The display apparatus of claim 5, wherein when grayscale values of the first first red pixel, the first first green pixel, the first first blue pixel, the second first green pixel, the first second blue pixel, the first second green pixel, the first second red pixel and the second second green pixel are r11, g11, b11, g12, b21, g21, r21 and g22, respectively, and grayscale values of the input image data corresponding to the first first red pixel, the first first green pixel, the first first blue pixel, the second first green pixel, the first second blue pixel, the first second green pixel, the first second red pixel and the second second green pixel are R11, G11, B11, R12, G12, B12, R21, G21, B21, R22, G22 and B22, respectively, the following equations: $r11=r21-(R11+R12+R21+R22)/4$; $b11=b21=(B11+B12+B21+B22)/4$; and $g11=g12-g21-g22-(G11+G12+G21+G22)/4$ are satisfied.

7. The display apparatus of claim 5, wherein when grayscale values of the first first red pixel, the first first green pixel, the first first blue pixel, the second first green pixel, the first second blue pixel, the first second green pixel, the first second red pixel and the second second green pixel are r11, g11, b11, g12, b21, g21, r21 and g22, respectively, and grayscale values of the input image data corresponding to the first first red pixel, the first first green pixel, the first first blue pixel, the second first green pixel, the first second blue pixel, the first second green pixel, the first second red pixel and the second second green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g21=(G11+G21)/2$; and $g12=g22=(G12+G22)/2$ are satisfied.

8. The display apparatus of claim 5, wherein when grayscale values of the first first red pixel, the first first green pixel, the first first blue pixel, the second first green pixel, the first second blue pixel, the first second green pixel, the first second red pixel and the second second green pixel are r11, g11, b11, g12, b21, g21, r21 and g22, respectively, and grayscale values of the input image data corresponding to the first first red pixel, the first first green pixel, the first first blue pixel, the second first green pixel, the first second blue pixel, the first second green pixel, the first second red pixel and the second second green pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=g22=(G11+G22)/2$; and $g12-g21=(G12+G21)/2$ are satisfied.

9. The display apparatus of claim 1, wherein the display panel includes a first first green pixel, a first first blue pixel, a second first green pixel and a first first red pixel, which are sequentially disposed in the first row, and a first second green pixel, a first second red pixel, a second second green pixel and a first second blue pixel, which are sequentially disposed in the second row, wherein each of the first first red pixel and the first second blue pixel is the normal pixel, and the first first blue pixel and the first second red pixel is the viewing angle control pixel, and wherein each of the first first green pixel and the second first green pixel is the viewing angle control pixel, and the first second green pixel and the second second green pixel is the normal pixel.

10. The display apparatus of claim 9, wherein when grayscale values of the first first green pixel, the first first blue pixel, the second first green pixel, the first first red pixel, the first second green pixel, the first second red pixel, the second second green pixel and the first second blue pixel are g11, b11, g12, r11, g21, r21, g22 and b21, respectively, and grayscale values of the input image data corresponding to the first first green pixel, the first first blue pixel, the second first green pixel, the first first red pixel, the first second green pixel, the first second red pixel, the second second green pixel and the first second blue pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; and $g11=g12-921-922=(G11+G12+G21+G22)/4$ are satisfied.

11. The display apparatus of claim 9, wherein when grayscale values of the first first green pixel, the first first blue pixel, the second first green pixel, the first first red pixel, the first second green pixel, the first second red pixel, the second second green pixel and the first second blue pixel are g11, b11, g12, r11, g21, r21, g22 and b21, respectively, and grayscale values of the input image data corresponding to the first first green pixel, the first first blue pixel, the second first green pixel, the first first red pixel, the first second green pixel, the first second red pixel, the second second green pixel and the first second blue pixel are R11, G11, B11, R12, G12, B12, R21, G21, B21, R22, G22 and B22, respectively, the following equations: $r11=r21=(R11+R12+R21+R22)/4$; $b11=b21=(B11+B12+B21+B22)/4$; $g11=921=(G11+G21)/2$; and $g12=g22=(G12+G22)/2$ are satisfied.

12. The display apparatus of claim 1, wherein the display panel includes a first first blue pixel, a first first green pixel, a first first red pixel and a second first green pixel, which are sequentially disposed in the first row, and a first second red pixel, a first second green pixel, a first second blue pixel and a second second green pixel, which are sequentially disposed in the second row, wherein each of the first first blue pixel and the first second red pixel is the normal pixel and the first first red pixel and the first second blue pixel is the viewing angle control pixel, and wherein each of the first first green pixel and the second first green pixel is the normal pixels and the first second green pixel and the second second green pixel is the viewing angle control pixel.

13. The display apparatus of claim 12, wherein when grayscale values of the first first blue pixel, the first first green pixel, the first first red pixel, the second first green pixel, the first second red pixel, the first second green pixel, the first second blue pixel and the second second green pixel are b11, g11, r11, g12, r21, g21, b21 and g22, respectively, and grayscale values of the input image data corresponding to the first first blue pixel, the first first green pixel, the first first red pixel, the second first green pixel, the first second red pixel, the first second green pixel, the first second blue pixel and the second second green pixel are R11, G11, B11, R12, G12, B12, R21, G21, B21, R22, G22 and B22, respectively, the following equations: r11=r21=(R11+R12+R21+R22)/4; b11–b21=(B11+B12+B21+B22)/4; and g11=g12–g21–g22–(G11+G12+G21+G22)/4 are satisfied.

14. The display apparatus of claim 12, wherein when grayscale values of the first first blue pixel, the first first green pixel, the first first red pixel, the second first green pixel, the first second red pixel, the first second green pixel, the first second blue pixel and the second second green pixel are b11, g11, r11, g12, r21, g21, b21 and g22, respectively, and grayscale values of the input image data corresponding to the first first blue pixel, the first first green pixel, the first first red pixel, the second first green pixel, the first second red pixel, the first second green pixel, the first second blue pixel and the second second green pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; g11=g21=(G11+G21)/2; and g12=g22=(G12+G22)/2 are satisfied.

15. The display apparatus of claim 1, wherein the display panel includes a first first green pixel, a first first red pixel, a second first green pixel and a first first blue pixel sequentially disposed in the first row and a first second green pixel, a first second blue pixel, a second second green pixel and a first second red pixel, which are sequentially disposed in the second row, wherein each of the first first red pixel and the first second blue pixel are the viewing angle control pixels and the first first blue pixel and the first second red pixel is the normal pixel, and wherein each of the first first green pixel and the second first green pixel are the normal pixels and the first second green pixel and the second second green pixel is the viewing angle control pixel.

16. The display apparatus of claim 15, wherein when grayscale values of the first first green pixel, the first first red pixel, the second first green pixel, the first first blue pixel, the first second green pixel, the first second blue pixel, the second second green pixel and the first second red pixel are g11, r11, g12, b11, g21, b21, g22 and r21, respectively, and grayscale values of the input image data corresponding to the first first green pixel, the first first red pixel, the second first green pixel, the first first blue pixel, the first second green pixel, the first second blue pixel, the second second green pixel and the first second red pixel are R11, G11, B11, R12, G12, B12, R21, G21, B21, R22, G22 and B22, respectively, the following equations: r11=r21=(R11+R12+R21+R22)/4; b11=b21=(B11+B12+B21+B22)/4; and g11=g12=g21=g22=(G11+G12+G21+G22)/4 are satisfied.

17. The display apparatus of claim 15, wherein when grayscale values of the first first green pixel, the first first red pixel, the second first green pixel, the first first blue pixel, the first second green pixel, the first second blue pixel, the second second green pixel and the first second red pixel are g11, r11, g12, b11, g21, b21, g22 and r21, respectively, and grayscale values of the input image data corresponding to the first first green pixel, the first first red pixel, the second first green pixel, the first first blue pixel, the first second green pixel, the first second blue pixel, the second second green pixel and the first second red pixel are R11, G11, B11, R12, G12, B12, R21, G21, B21, R22, G22 and B22, respectively, the following equations: r11=r21=(R11+R12+R21+R22)/4; b11–b21=(B11+B12+B21+B22)/4; g11–g21–(G11+G21)/2; and g12–g22–(G12+G22)/2 are satisfied.

18. The display apparatus of claim 1, wherein the display panel includes a red pixel and a green pixel disposed in a first first block, a blue pixel and a green pixel disposed in a second first block, a red pixel and a green pixel disposed in a third first block, a blue pixel and a green pixel disposed in a first second block, a red pixel and a green pixel disposed in a second second block, a blue pixel and a green pixel disposed in a third second block, a red pixel and a green pixel disposed in a first third block, a blue pixel and a green pixel disposed in a second third block and a red pixel and a green pixel disposed in a third third block, wherein when grayscale values of the input image data corresponding to the first first block, the second first block, the third first block, the first second block, the second second block, the third second block, the first third block, the second third block and the third third block are R11, G11, B11, R12, G12, B12, R13, G13, B13, R21, G21, B21, R22, G22, B22, R23, G23, B23, R31, G31, B31, R32, G32, B32, R33, G33 and B33, respectively, a grayscale value of the red pixel in the second second block is r22, and a grayscale value of the green pixel in the second second block is g22, the following equations: r22=R11*F1+R12*F2+R13*F3+R21*F4+R22*F5+R23*F6+R31*F7+R32*F8+R33*F9; g22-G11*F1+G12*F2+G13*F3+G21*F4+G22*F5+G23*F6+G31*F7+G32*F8+G33*F9; and F1+F2+F3+F4+F5+F6+F7+F8+F9=1 are satisfied.

19. A method of driving a display panel, the method comprising:

operating a rendering process determining a grayscale value of a pixel of the display panel from input image data; and displaying an image based on the grayscale value of the pixel, wherein the display panel includes a first row first color pixel and a first row second color pixel, which are disposed in a first row, and a second row first color pixel and a second row second color pixel, which are disposed in a second row, wherein one of the first row first color pixel and the second row first color pixel is a normal pixel, and the other of the first row first color pixel and the second row first color pixel is a viewing angle control pixel, wherein one of the first row second color pixel and the second row second color pixel is the normal pixel, and the other of the first row second color pixel and the second row second color pixel is the viewing angle control pixel, wherein a grayscale value of the first row first color pixel is the same as a grayscale value of the second row first color pixel, wherein a grayscale value of the first row second color pixel is the same as a grayscale value of the second row second color pixel, wherein the rendering process determines grayscale values of the pixels such that the grayscale value of the first row first color pixel is the same as the grayscale value of the second row first color pixel, and the grayscale value of the first row second color pixel is the same as the grayscale value of the second row second color pixel, wherein the rendering process prevents a color change defect in which colors are perceived differently from a front viewing angle and from a side viewing angle, thereby enhancing a display quality of the display panel, wherein the rendering process determines the grayscale value of the first row first color pixel and the grayscale value of the second row first color pixel to be the same, and the grayscale value of the first row second color pixel and the grayscale value of the second row second color pixel to be the same, even when the input image data for the first row first color pixel and the second row first color pixel are different, and even when the input image data for the first row second color pixel and the second row second color pixel are different.

20. The method of claim 19, wherein the display panel further comprises a first row third color pixel and a second row third color pixel, wherein one of the first row third color pixel and the second row third color pixel is the normal pixel, and the other of the first row third color pixel and the second row third color pixel is the viewing angle control pixel, and wherein a grayscale value of the first row third color pixel is the same as a grayscale value of the second row third color pixel.

* * * * *